US012695210B2

(12) United States Patent　　　　(10) Patent No.:　US 12,695,210 B2

Rostomyan　　　　　　　　　　　　　(45) Date of Patent:　　　Jul. 28, 2026

(54) MODULAR, MULTI-CHANNEL BEAMFORMER FRONT-END INTEGRATED CIRCUITS FOR MILLIMETER WAVE APPLICATIONS

(71) Applicant: BDCM A2 LLC, Dover, DE (US)

(72) Inventor: Narek Rostomyan, San Diego, CA (US)

(73) Assignee: BDCM A2 LLC, Dover, DE (US)

( * ) Notice: Subject to any disclaimer, the term of this patent is extended or adjusted under 35 U.S.C. 154(b) by 0 days.

(21) Appl. No.: 17/181,939

(22) Filed: Feb. 22, 2021

(65)　　　　　　Prior Publication Data

US 2021/0296783 A1　　　Sep. 23, 2021

Related U.S. Application Data

(60) Provisional application No. 62/979,387, filed on Feb. 20, 2020.

(51) Int. Cl.
| | |
|---|---|
| *H01Q 21/06* | (2006.01) |
| *G01S 7/03* | (2006.01) |
| *G01S 13/931* | (2020.01) |
| *H01Q 1/32* | (2006.01) |

(52) U.S. Cl.
CPC ............. *H01Q 21/061* (2013.01); *G01S 7/03* (2013.01); *G01S 13/931* (2013.01); *H01Q 1/3233* (2013.01)

(58) Field of Classification Search
CPC ........ G01S 7/03; G01S 13/931; G01S 13/426; G01S 13/584; G01S 7/032; G01S 13/4463; G01S 2013/0254; H01Q 1/3233; H01Q 1/2283; H01Q 21/28; H01Q 3/40
See application file for complete search history.

(56)　　　　　　References Cited

U.S. PATENT DOCUMENTS

| | | | | |
|---|---|---|---|---|
| 10,141,657 | B2 * | 11/2018 | Kishigami | ............... G01S 13/26 |
| 10,713,552 | B2 * | 7/2020 | Kato | ..................... G06K 19/077 |
| 10,727,923 | B2 * | 7/2020 | Thyagarajan | .......... H04B 17/12 |

(Continued)

FOREIGN PATENT DOCUMENTS

WO　　　WO-2019187872 A1 * 10/2019　　............... H04B 1/38

OTHER PUBLICATIONS

A.Nysaeter and H. Iwe, "Antenna processing optimization for a colocated MIMO radar," 2016 IEEE Radar Conference (RadarConf), 2016, pp. 1-5, doi: 10.1109/RADAR.2016.7485290. (Year: 2016).*

(Continued)

*Primary Examiner* — Yonghong Li
(74) *Attorney, Agent, or Firm* — Dinsmore & Shohl LLP

(57)　　　　　　ABSTRACT

Examples disclosed herein relate to a modular, multi-channel beamformer front-end integrated circuits for millimeter wave applications. A beamformer tile includes an array of radiating elements, and a plurality of radio frequency (RF) integrated circuits coupled to the array of radiating elements and configured to apply phase shifting to transmit signaling directed to the array of radiating elements for a transmit operation and to return signaling from the array of radiating elements for a receive operation, in which each of the plurality of radio frequency integrated circuits comprises a plurality of Multiple-In-Multiple-Out (MIMO) channels that are coupled to a subset of the array of radiating elements. Other examples disclosed herein relate to beamforming antenna system.

16 Claims, 20 Drawing Sheets

(56)          References Cited

U.S. PATENT DOCUMENTS

| | | | |
|---|---|---|---|
| 2007/0210959 A1* | 9/2007 | Herd | H01Q 3/26 |
| | | | 342/368 |
| 2011/0148707 A1* | 6/2011 | Thiesen | H01Q 3/2605 |
| | | | 342/372 |
| 2016/0146931 A1* | 5/2016 | Rao | G01S 13/931 |
| | | | 342/59 |
| 2017/0187248 A1* | 6/2017 | Leabman | H01Q 1/02 |
| 2019/0339382 A1* | 11/2019 | Hess | G01S 13/42 |
| 2019/0344784 A1* | 11/2019 | You | B60W 10/20 |
| 2020/0139962 A1* | 5/2020 | Kim | B60W 10/18 |
| 2020/0182964 A1* | 6/2020 | Di Nallo | H01Q 5/385 |
| 2021/0159946 A1* | 5/2021 | Raghavan | H01Q 21/24 |

OTHER PUBLICATIONS

WO_2019187872_A1_I_translate.pdf (Year: 2019).*

* cited by examiner

1800

1802 SPI

1806 BIAS CONTROL

TO TX / RX COMPONENTS $I_{PTAT}$ $(0.75)I_{PTAT}$ $(1.25)I_{PTAT}$

1804 PTAT

1850

| 23 | .. | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| Reserved for future use | | | | | Bias5 | | Bias4 | | Bias3 | | Bias2 | | Bias1 | | Bias0 | |

MODULAR, MULTI-CHANNEL BEAMFORMER FRONT-END INTEGRATED CIRCUITS FOR MILLIMETER WAVE APPLICATIONS

CLAIM OF PRIORITY

This application claims priority from U.S. Provisional Application No. 62/979,387, titled "Modular, Multi-Channel Beamformer Front-End Integrated Circuits For Millimeter Wave Applications," filed on Feb. 22, 2020, and incorporated herein by reference in its entirety.

BACKGROUND

Wireless systems operate over a range of frequencies. Each frequency range has its own specifications and goals for operation with desired performance. For example, millimeter wavelength applications have emerged to address the need for higher bandwidth and data rates. The millimeter wavelength spectrum covers a large range of frequencies, such as between 30 GHz and 300 GHz, and may reach data rates of 10 gigabits-per-second or more with wavelengths in the 1 to 10 mm range. The shorter wavelengths have distinct advantages, including better resolution, high frequency reuse and directed beamforming that are critical in wireless communications and autonomous driving applications. The shorter wavelengths are, however, susceptible to high atmospheric attenuation and have a limited range (just over a kilometer). Additionally, the higher frequency corresponds to an increase in power for transmission and thus is restricted in many applications, such as by automotive restrictions or by communication system limitations. In automotive applications the radar transmission frequencies are restricted to specific frequency bands, which are currently approximately 76 GHz to 81 GHz, and the range of these radar signals must be sufficient to provide the automotive system with environmental information at high rates of speed. For example, if a vehicle is moving at 100 kilometers per hour the stopping range is approximately 60 m. To achieve high frequency signals with this range is challenging. In a directed beam cellular communication system, such as defined by 2GPP as 5G, the transmissions are to carry very high data rates in very short time with increased capacity. To achieve these operational goals, he coverage area is not omnidirectional but rather energy is concentrated on the narrow beam transmitted to specific areas and the range is challenging to achieve.

In many of these applications, phase shifters are needed to achieve a full range of phase shifts to direct beams to desired directions. Designing millimeter wave phase shifters is challenging as losses must be minimized in miniaturized circuits while providing phase shifts anywhere from 0° to 360°. The circuits and systems designed for one frequency may perform poorly at other frequencies, such as with the introduction of losses, parasitic effects, and so forth.

BRIEF DESCRIPTION OF THE DRAWINGS

The present application may be more fully appreciated in connection with the following detailed description taken in conjunction with the accompanying drawings, which are not drawn to scale, in which like reference characters refer to like parts throughout, and in which.

DETAILED DESCRIPTION

Figure 1:
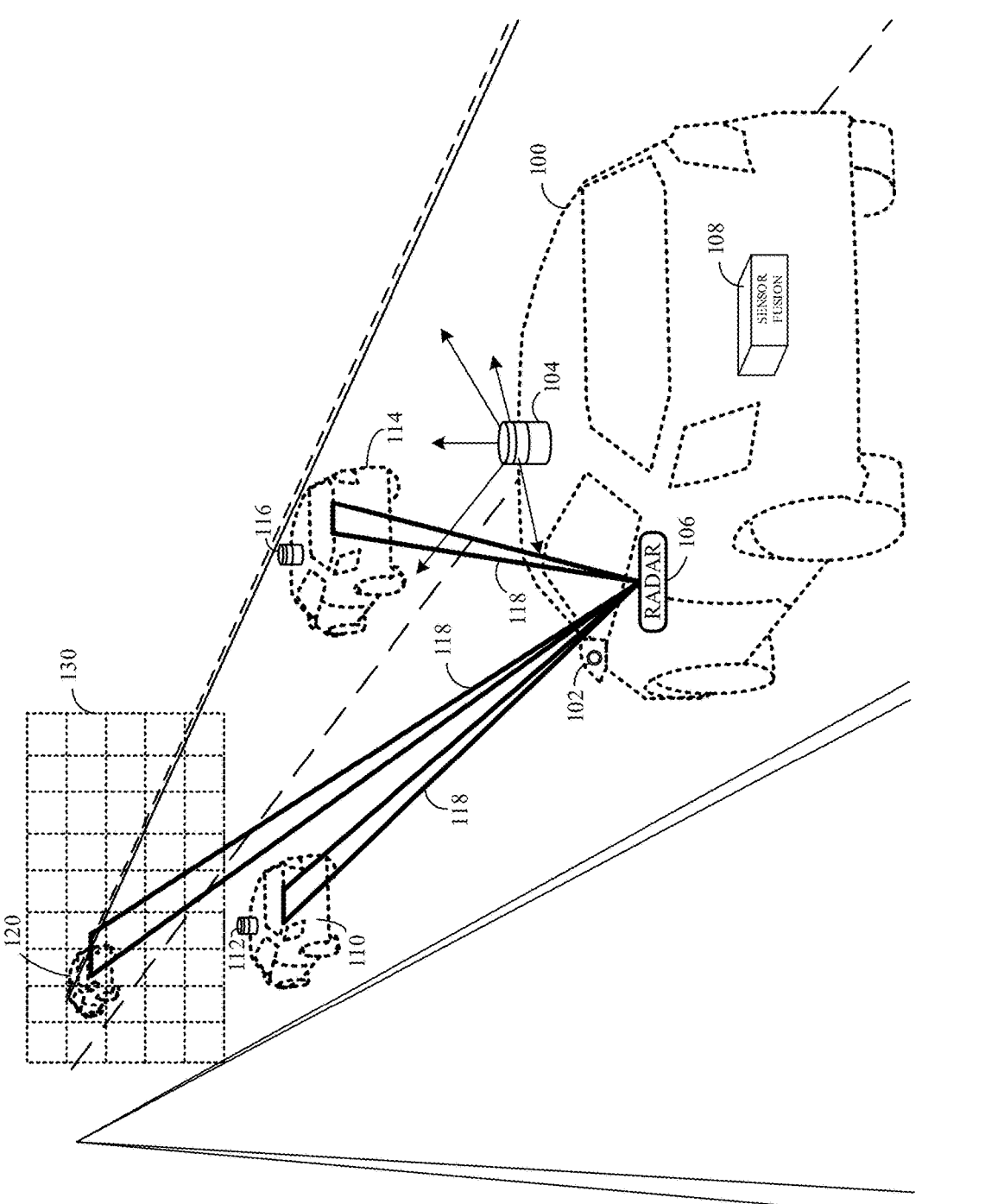
FIG. 1 illustrates an example environment in which a beam steering radar in an autonomous vehicle is used to detect and identify objects in accordance with one or more implementations of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

Wireless systems have both transmission and reception modules, such as to detect a target with a radar system and to send and receive communications with a cellular system. Beamforming is used to change the transmit and receive radiation signals. These systems have multiple antenna elements spaced according to the wavelength of the processed signals, in which the antenna elements are controlled so that signals received at each antenna element has a phase relationship to other elements. This phase relationship may indicate a phase difference that controls the direction of the radiated beam. In many wireless communication systems, there is a uniform phase difference that increases from one antenna element to another.

Antenna performance in resolution, range and field of view is becoming a critical focus of design and implementation of antenna technologies. This is due in large part to the ubiquity of wireless communications, the specifications of new wireless communication standards and technologies, such as 3GPP specified Fifth Generation (5G) cellular, and to advances in automation for automotive technologies, in particular, autonomous vehicles and driver-assist technology.

Beamforming and beam steering are utilized to direct signals from individual antennas over a desired Field-of-View (FoV). For radar, this means the area within which the radar transmission reaches at an energy level sufficient to enable detection of objects, or targets. In wireless communications, this means the area within which a user (which may be referred to as having User Equipment (UE)) is detected and a communication is maintained, such as to track a UE. As automation at driving speeds and movement of UEs become more prevalent in cities, around buildings and so forth, such technology may benefit from am antenna system capable to steer the beam and adjust (or modify) the beamform rapidly. In many applications, these changes are done in microseconds, such as when a car is driving at 80 miles per hour, or 50 km per hour. Additionally, these antennas are to perform well in a variety of environments, including weather conditions and infrastructures.

This often incurs complex circuitry formed in multiple layers of substrates, wherein electrical lines, transmission lines and components are positioned in close proximity. Miniaturization is a process of using less space for these various parts of circuitry, and often introduces unwanted effects, such as the introduction of losses, degraded performance, parasitic effects and so forth. When these miniaturized, condensed circuits are to operate at high frequencies than they were originally designed, such as at 77 GHz for new automotive standards, parasitic effects are to be mitigated. Components are connected through layers in a substrate by landing pad structures, stubs, or junctions. These structures may introduce parasitic capacitance.

In some example, the subject technology provides for a modular, multi-channel beamformer front-end integrated circuits for millimeter wave applications. A beamformer tile includes an array of radiating elements, and a plurality of radio frequency (RF) integrated circuits coupled to the array of radiating elements and configured to apply phase shifting to transmit signaling directed to the array of radiating elements for a transmit operation and to apply phase shifting to return signaling from the array of radiating elements for a receive operation, in which each of the plurality of radio frequency ICs (RFICs) creates a plurality of Multiple-In-Multiple-Out (MIMO) channels through a subset of the array of radiating elements. In some examples, the MIMO is implemented as effective virtual channels that use the positioning by phase, amplitude, or other signal parameters to achieve the behavior of a much larger array of radiating elements.

The subject technology is a silicon (Si)-based multi-channel beamformer (e.g., 4-16 channels) front-end integrated circuit for transmitter and receiver operations. The subject technology achieves substantial reduction in area, cost, printed circuit board complexity, and assembly. The subject technology reduces power consumption compared to traditional front-end circuits. The subject technology achieves higher functionality and higher reliability (including higher yield and larger integration capability). The subject technology facilitates integration with digital calibration and serial interfaces, analog and digital converters, various sensors, and bias control. The subject technology also lowers packaging parasitics and reduces cost with the flip-chip implementation.

FIG. 1 illustrates an example environment in which a beam steering radar 106 in an autonomous vehicle 100 is used to detect and identify objects, according to various implementations of the subject technology. Ego vehicle 100 is an autonomous vehicle with a beam steering radar system 106 for transmitting a radar signal to scan a FoV or specific area, such as area 130. As described in more detail below, the radar signal is transmitted according to a set of scan parameters that may be adjusted to result in multiple transmission beams 118. The scan parameters may include, among others, the total angle of the scanned area defining the FoV, the beam width or the scan angle of each incremental transmission beam, the number of chirps in the radar signal, the chirp time, the chirp segment time, the chirp slope, and so on. The entire FoV including areas between the area 130 and the radar system 106 or a portion of it may be scanned by a compilation of such transmission beams 118, which may be in successive adjacent scan positions or in a specific or random order. Note that the term FoV is used herein in reference to the radar transmissions and does not imply an optical FoV with unobstructed views. The scan parameters may also indicate the time interval between these incremental transmission beams, as well as start and stop angle positions for a full or partial scan.

In various examples, the ego vehicle 100 may also have other perception sensors, such as a camera 102 and a lidar 104. These perception sensors may be incorporated into the ego vehicle 100 in some embodiments and may be useful in augmenting the object detection capabilities of the beam steering radar 106. The camera 102 may be used to detect visible objects and conditions and to assist in the performance of various functions. The lidar 104 may also be used to detect objects and provide this information to adjust control of the ego vehicle 100. This information may include information such as congestion on a highway, road conditions, and other conditions that would impact the sensors, actions, or operations of the vehicle. Existing automated driver assistance system, ADAS, modules utilize camera sensors to assist drivers in driving functions, such as parking (e.g., in rear view cameras). Cameras capture texture, color and contrast information at a high level of detail but uses significant computation for object identification and similar to the human eye, they are susceptible to adverse weather conditions and variations in lighting. The camera 102 may have a high resolution but may not resolve objects beyond 50 meters and imposes a latency on identification of objects.

Lidar sensors typically measure the distance to an object by calculating the time taken by a pulse of light to travel to an object and back to the sensor. When positioned on top of a vehicle, a lidar sensor may provide a 360° 3D view of the surrounding environment. Other approaches may use several lidars at different locations around the vehicle to provide the full 360° view. However, lidar sensors such as lidar 104 are still prohibitively expensive, bulky in size, sensitive to weather conditions and are limited to short ranges (e.g., less than 150-300 meters). Radars, on the other hand, have been used in vehicles for many years for near range information, such as lane detection, rear mirror assistance features, and cruise control operation. A major advantage of radar is the ability to operate in all-weather conditions. Radar sensors also use far less processing than the other types of sensors and have the advantage of detecting objects behind obstacles and determining the speed of moving objects. When it comes to resolution, the laser beams emitted by the lidar 104 are focused on small areas, have a smaller wavelength than RF signals, and achieve less than one degree resolution.

In various examples and as described in more detail below, the beam steering radar 106 may provide a 360° true 3D vision and human-like interpretation of the path and surrounding environment of the ego vehicle 100. The beam steering radar 106 is capable of shaping and steering RF beams in all directions in a 360° foV with at least one beam steering antenna and recognize objects quickly and with a high degree of accuracy over a long range of around 300 meters or more. The short-range capabilities of the camera 102 and the lidar 104 along with the long-range capabilities of the radar 106 enable a sensor fusion module 108 in the ego vehicle 100 to enhance its object detection and identification. The sensor fusion module 108 may be a single unit or a distributed set of units that combines multiple sensor signals to make intelligent detection. For example, the sensor fusion 108 may use radar sensors to identify the location and velocity of an object and then incorporate camera information to assist in object identification.

As illustrated, the beam steering radar 106 may detect both vehicle 120 at a far range (e.g., greater than 350 m) as well as a vehicles 110 and 114 at short ranges (e.g., less than 100 m). Detecting multiple vehicles or objects in the FoV in a short amount of time and with enough range and velocity resolution is considered an imperative for full autonomy of driving functions of the ego vehicle. The radar 106 has an adjustable Long-Range Radar (LRR) mode that enables the detection of long-range objects in a very short time to then focus on obtaining finer velocity resolution for the detected vehicles. Although not described herein, radar 106 is capable of time-alternatively reconfiguring between LRR and Short-Range Radar (SRR) modes. The SRR mode enables a wide beam with lower gain but is able to make quick decisions to avoid an accident, assist in parking and downtown travel, and capture information about a broad area of the environment. The LRR mode enables a narrow, directed beam and long distance, having high gain; this is powerful for high-speed applications, and where longer processing time allows for greater reliability. Excessive dwell time for each beam position may cause blind zones, and the adjustable LRR mode ensures that fast object detection may occur at long range while maintaining the antenna gain, transmit power and desired Signal-to-Noise Ratio (SNR) for the radar operation. While the environment illustration of FIG. 1 includes vehicles as objects, there are many other objects that may be detected where the velocity is important in identification, such as a wall or other static object that is at zero velocity; this information is used to identify objects. In the variety of situations, the goal is to detect, identify and react in the shortest time period.

Figure 2:
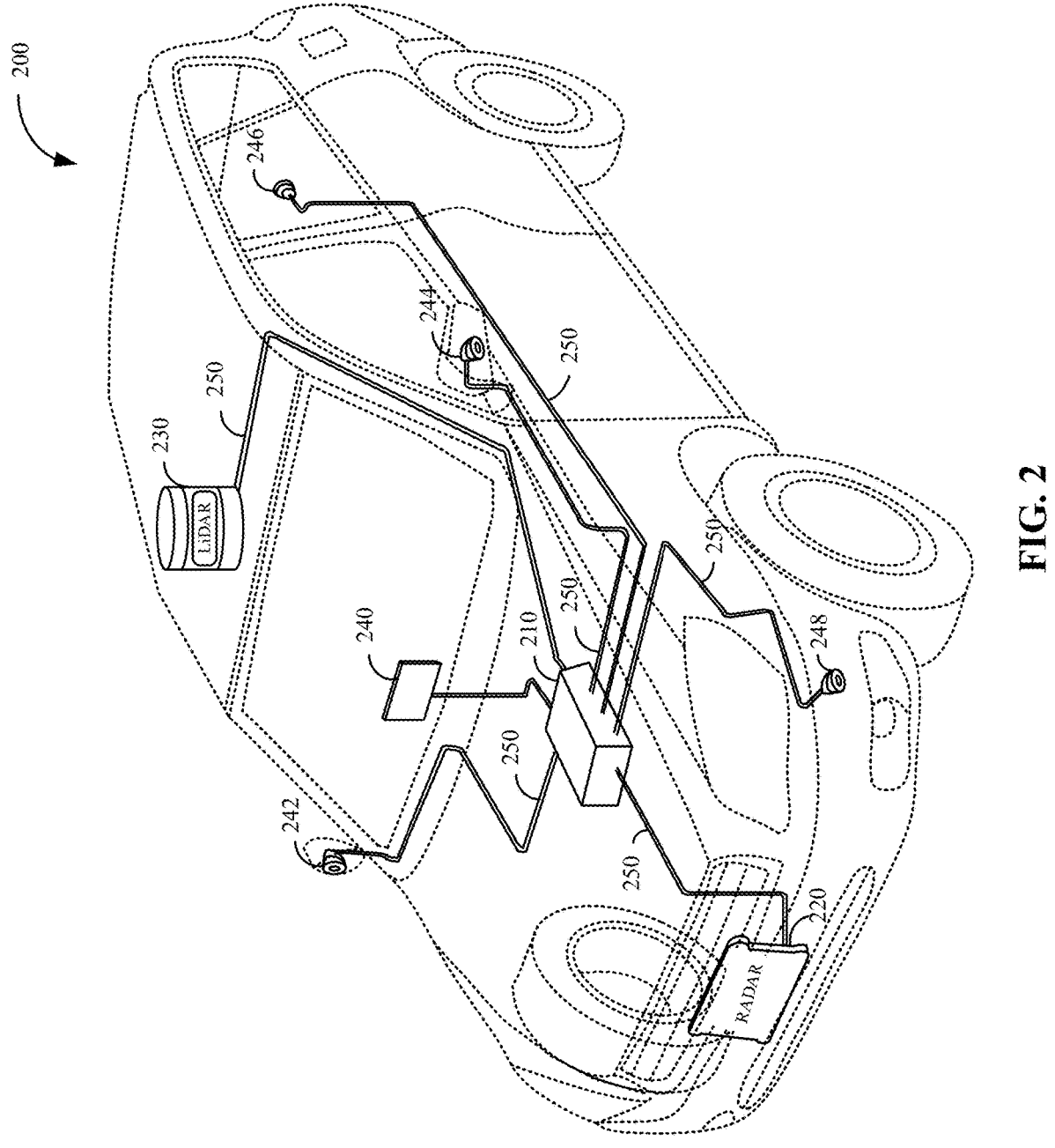
FIG. 2 illustrates an example network environment in which a radar system may be implemented in accordance with one or more implementations of the subject technology.

FIG. 2 illustrates an example network environment 200 in which a radar system may be implemented in accordance with one or more implementations of the subject technology. The example network environment 200 includes several electronic devices, including sensors and driver communication devices, and specifically radar module 220, lidar module 230, entertainment information system 240, and cameras 242, 244, 246, 248, that are all coupled to an electronic controller 210 via the transmission lines 250. The electronic controller 210 may communicably couple the electronic devices 242, 244, 246, 248 to one another. In one or more implementations, one or more of the several electronic devices are communicatively coupled directly to one another, such as without the support of the electronic controller 210 or in addition to coupling through controller 210. Alternate systems may incorporate one or more of the several electronic devices and components or some combination thereof, and one or more implementations may include additional components not shown in the figure. Variations in the arrangement and type of the components may be made without departing from the scope and limitations of the claims as set forth herein. Additional components, different components, or fewer components may be provided.

In some implementations, one or more of the transmission lines 250 are Ethernet transmission lines. In this respect, the electronic devices 220, 230, 240, 242, 244, 246, 248 and 210 may implement a physical layer (PHY) that is interoperable with one or more respects, of one or more physical layer specifications, such as those described in the Institute of Electrical and Electronics Engineers (IEEE) 802.3 Standards (e.g., 802.3ch). The electronic device 210 may be, or may include, a switch device, a routing device, a hub device, or generally any device that may communicably couple the electronic devices 220, 230, 240, 242, 244, 246, and 248.

In one or more implementations, at least a portion of the example network environment 200 is implemented within a vehicle, such as a passenger car. For example, the electronic devices 242, 244, 246, 248 may include, or may be coupled to, various systems within a vehicle, such as a powertrain system, a chassis system, a telematics system, an entertainment system, a camera system, a sensor system, such as a lane departure system, a diagnostics system, or generally any system that may be used in a vehicle. In FIG. 2, the electronic device 210 is depicted as a central processing unit, the electronic device 220 is depicted as a radar system, the electronic device 230 is depicted as a LiDAR system, the electronic device 240 is depicted as an entertainment interface unit, and the electronic devices 242, 244, 246, 248 are depicted as camera devices, such as forward-view, rear-view and side-view cameras. In one or more implementations, the electronic device 210 and/or one or more of the electronic devices 242, 244, 246, 248 may be communicatively coupled to a public communication network, such as the Internet. The system 200 is provided as an example of a configuration of sensors and communication devices in a vehicular ADAS or autonomous system.

Figure 3:
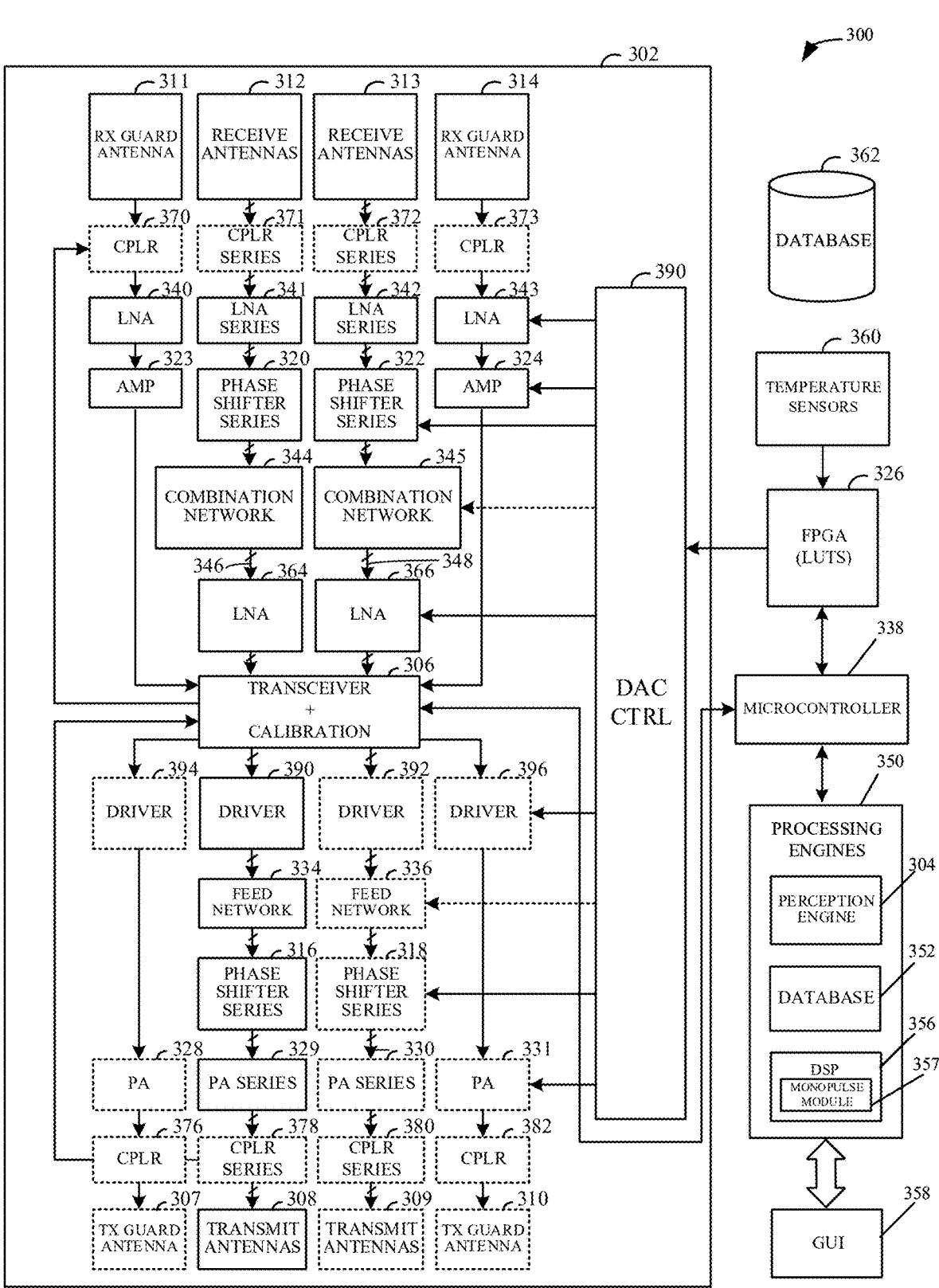
FIG. 3 illustrates a schematic diagram of a radar system in accordance with various implementations of the subject technology.

FIG. 3 illustrates a schematic diagram of a radar system 300 in accordance with various implementations of the subject technology. The radar module 300 includes a radar module 302 that comprises a receive chain and a transmit chain. The receive chain includes receive antennas 312 and 313, receive guard antennas 311 and 314, couplers 370-673, low-noise amplifiers (LNAs) 340-643, phase shifter (PS) circuits 320 and 322, amplifiers 323, 324, 364 and 366, and combination networks 344 and 345. The transmit chain includes drivers 390, 392, 394 and 396, feed networks 334 and 336, PS circuits 316 and 318, power amplifiers 328-631, couplers 376, 378, 380 and 382, transmit antennas 308 and 309, and transmit guard antennas 307 and 310. The radar module 302 also includes a transceiver 306, a digital-to-analog (DAC) controller 390, a Field-Programmable Gate Array (FPGA) 326, a microcontroller 338, processing engines 350, a Graphical User Interface (GUI) 358, temperature sensors 360 and a database 362. The processing engines 350 includes perception engine 304, database 352 and Digital Signal Processor (DSP) 356. Not all of the depicted components may be incorporated, however, and one or more implementations may include additional components not shown in the figure. Variations in the arrangement and type of the components may be made without departing from the scope of the claims as set forth herein. Additional components, different components, or fewer components may be provided.

In some implementations, the electronic device 310 of FIG. 3 may include one or more of the FPGA 326, the microcontroller 338, the processing engines 350, the temperature sensors 360 or the database 362. In some implementations, the electronic device 340 of FIG. 3 is, or includes at least a portion of, the GUI 358.

Radar module 302 is capable of both transmitting RF signals within a FoV and receiving the reflections of the transmitted signals as they reflect from objects in the FoV. With the use of analog beamforming in radar module 302, a single transmit and receive chain may be used effectively to form a directional, as well as a steerable, beam. A transceiver 306 in radar module 302 may generate signals for transmission through a series of transmit antennas 308 and 309 as well as manage signals received through a series of receive antennas 312 and 313. Beam steering within the FoV is implemented with phase shifter (PS) circuits 316 and 318 coupled to the transmit antennas 308 and 309, respectively, on the transmit chain and PS circuits 320 and 322 coupled to the receive antennas 312 and 313, respectively, on the receive chain. Careful phase and amplitude calibration of the transmit antennas 308, 309 and receive antennas 312, 313 may be performed in real-time with the use of couplers integrated into the radar module 302 as described in more detail below. In other implementations, calibration is performed before the radar is deployed in an ego vehicle and the couplers may be removed.

The use of PS circuits 316, 318 and 320, 322 enables separate control of the phase of each element in the transmit antennas 308, 309 and receive antennas 312, 313. Unlike early passive architectures, the beam is steerable not only to discrete angles but to any angle (i.e., from 0° to 360°) within the FoV using active beamforming antennas. A multiple element antenna may be used with an analog beamforming architecture where the individual antenna elements may be combined or divided at the port of the single transmit or receive chain without additional hardware components or individual digital processing for each antenna element. Further, the flexibility of multiple element antennas allows narrow beam width for transmit and receive. The antenna beam width decreases with an increase in the number of antenna elements. A narrow beam improves the directivity of the antenna and provides the radar system 300 with a significantly longer detection range.

The DAC controller 390 is coupled to each of the LNAs 340-643, the amplifiers 323, 324, 364, 366, PS circuits 316, 318, 320, 322, the drivers 390, 392, 394, 396, and the power amplifiers (PAS) 328-631. In some respects, the DAC controller 390 is coupled to the FPGA 326, and the FPGA 326 may drive digital signaling to the DAC controller 390 to provide analog signaling to the LNAs 340-643, the amplifiers 323, 324, 364, 366, PS circuits 316, 318, 320, 322, the drivers 390, 392, 394, 396, and the PAs 328-631. In some implementations, the DAC controller 390 is coupled to the combination networks 344, 345 and to the feed networks 334, 336.

In various examples, an analog control signal is applied to each PS in the PS circuits 316, 318 and 320, 322 by the DAC controller 390 to generate a given phase shift and provide beam steering. The analog control signals applied to the PSs in PS circuits 316, 318 and 320, 322 are based on voltage values that are stored in Look-up Tables (LUTs) in the FPGA 326. These LUTs are generated by an antenna calibration process that determines which voltages to apply to each PS to generate a given phase shift under each operating condition. Note that the PSs in PS circuits 316, 318 and 320, 322 may generate phase shifts at a very high resolution of less than one degree. This enhanced control over the phase allows the transmit and receive antennas in radar module 302 to steer beams with a very small step size, improving the capability of the radar system 300 to resolve closely located targets at small angular resolution.

In various examples, each of the transmit antennas 308, 309 and the receive antennas 312, 313 may be a meta-structure antenna, a phase array antenna, or any other antenna capable of radiating RF signals in millimeter wave frequencies. A meta-structure, as generally defined herein, is an engineered structure capable of controlling and manipulating incident radiation at a desired direction based on its geometry. Various configurations, shapes, designs and dimensions of the transmit antennas 308, 309 and the receive antennas 312, 313 may be used to implement specific designs and meet specific constraints.

The transmit chain in the radar module 302 starts with the transceiver 306 generating RF signals to prepare for transmission over-the-air by the transmit antennas 308 and 309. The RF signals may be, for example, Frequency-Modulated Continuous Wave (FMCW) signals. An FMCW signal enables the radar system 300 to determine both the range to an object and the object's velocity by measuring the differences in phase or frequency between the transmitted signals and the received/reflected signals or echoes. Within FMCW formats, there are a variety of waveform patterns that may be used, including sinusoidal, triangular, sawtooth, rectangular and so forth, each having advantages and purposes.

FMCW transmit waveforms are given by the general equation:

$$x(t) = \mathrm{Re}\{Ae^{i(\omega_c + Kt)t + i\varphi_o(t)}\}$$

where K is the chirp ramp slope, and $\varphi_o(t) = 2\pi f_o t$. $f_o$ is the desired frequency offset. The frequency offset may be created with a linear phase shift versus time using RF phase shifters. These examples keep the Nyquist sample rate for the control voltage of at least x2 the desired highest offset frequency. The present inventions overcome some of the challenges in using FMCW related to spectrum replicas, phase shifter quantization and spurs; some embodiments implement high resolution DACs, such as 12-14 bit, for precise phase shifter calibration. The present invention provides beamforming solutions with SiGe phase shifter and VGA, wherein the phase shifter is built as a flip-chip.

Once the FMCW signals are generated by the transceiver 306, the FMCW signals are fed to driver 390. From the driver 390, the signals are divided and distributed through feed network 334, which forms a power divider system to divide an input signal into multiple signals, one for each element of the transmit antennas 308. The feed network 334 may divide the signals so power is equally distributed among them or alternatively, so power is distributed according to another scheme, in which the divided signals do not all receive the same power. Each signal from the feed network 334 is then input to the PS circuit 316, where the FMCW signals are phase shifted based on control signaling from the DAC controller 390 (corresponding to voltages generated by the FPGA 326 under the direction of microcontroller 338), and then transmitted to the PA series 329. The amplified signaling from the PA series 329 is coupled to the transmit antennas 308. Signal amplification is needed for the FMCW signals to reach the long ranges desired for object detection, as the signals attenuate as they radiate by the transmit antennas 308.

In some implementations, the radar system 300 optionally includes multiple transmit chains. For example, a first transmit chain includes driver 390, feed network 334, phase shifter series 316, PA series 329, and transmit antennas 308, and a second transmit chain includes driver 392, feed network 336, phase shifter series 318, PA series 330, and transmit antennas 309. Once the FMCW signals are generated by the transceiver 306, the FMCW signals are fed to drivers 390 and 392. From the drivers 390 and 392, the signals are divided and distributed through feed networks 334 and 336, respectively, which form a power divider system to divide an input signal into multiple signals, one for each element of the transmit antennas 308 and 309, respectively. The feed networks 334 and 336 may divide the signals so power is equally distributed among them or alternatively, so power is distributed according to another scheme, in which the divided signals do not all receive the same power. Each signal from the feed networks 334 and 336 is then input to the PS circuits 316 and 318, respectively, where the FMCW signals are phase shifted based on control signaling from the DAC controller 390 (corresponding to voltages generated by the FPGA 326 under the direction of microcontroller 338), and then transmitted to the PAs 329 and 330. The amplified signaling from PAs 329 and 330 are respectively coupled to the transmit antennas 308 and 309. Signal amplification is needed for the FMCW signals to reach the long ranges desired for object detection, as the signals attenuate as they radiate by the transmit antennas 308 and 309.

In some implementations, the couplers 378 and 380 are optionally coupled to the PAS 329 and 330 for calibration purposes. For example, from the PAs 329 and 330, the FMCW signals are fed to couplers 378 and 380, respectively, to generate calibration signaling that is fed back to the transceiver 306. From the couplers 378 and 380, the FMCW signals are transmitted through transmit antennas 308 and 309 to radiate the outgoing signaling. In some implementations, the PS circuit 316 is coupled to the transmit antennas 308 through the PA 329 and coupler 378, and the PS circuit 318 is coupled to the transmit antennas 309 through the PA 330 and coupler 380.

In some implementations, the transceiver 306 feeds the FMCW signals to drivers 394 and 396, which are then fed to PAs 328 and 332 and to the couplers 376 and 382. In some respects, the couplers 376 and 382 are coupled between the PAs 328 and 331 for calibration purposes. From these couplers, the FMCW signals are fed to the transmit guard antennas 307 and 310 for side lobe maycelation of the transmission signal. In some respects, the transmit guard antennas 307 and 310 are optionally coupled to the PAs 328 and 331 and to the drivers 394 and 396.

The microcontroller 338 determines which phase shifts to apply to the PSs in PS circuits 316, 318, 320 and 322 according to a desired scanning mode based on road and environmental scenarios. Microcontroller 338 also determines the scan parameters for the transceiver to apply at its next scan. The scan parameters may be determined at the direction of one of the processing engines 350, such as at the direction of perception engine 304. Depending on the objects detected, the perception engine 304 may instruct the microcontroller 338 to adjust the scan parameters at a next scan to focus on a given area of the FoV or to steer the beams to a different direction.

In various examples and as described in more detail below, radar system 300 operates in one of various modes, including a full scanning mode and a selective scanning mode, among others. In a full scanning mode, the transmit antennas 308, 309 and the receive antennas 312, 313 may scan a complete FoV with small incremental steps. Even though the FoV may be limited by system parameters due to increased side lobes as a function of the steering angle, radar system 300 is able to detect objects over a significant area for a long-range radar. The range of angles to be scanned on either side of boresight as well as the step size between steering angles/phase shifts may be dynamically varied based on the driving environment. To improve performance of an autonomous vehicle (e.g., an ego vehicle) driving through an urban environment, the scan range may be increased to keep monitoring the intersections and curbs to detect vehicles, pedestrians or bicyclists. This wide scan range may deteriorate the frame rate (revisit rate) but is considered acceptable as the urban environment generally involves low velocity driving scenarios. For a high-speed freeway scenario, where the frame rate is critical, a higher frame rate may be maintained by reducing the scan range. In this case, a few degrees of beam scanning on either side of the boresight would suffice for long-range target detection and tracking.

In a selective scanning mode, the radar system 300 scans around an area of interest by steering to a desired angle and then scanning around that angle. This ensures the radar system 300 is to detect objects in the area of interest without wasting any processing or scanning cycles illuminating areas with no valid objects. Since the radar system 300 may detect objects at a long distance, e.g., 300 m or more at boresight, if there is a curve in a road, direct measures do not provide helpful information. Rather, the radar system 300 steers along the curvature of the road and aligns its beams towards the area of interest. In various examples, the selective scanning mode may be implemented by changing the chirp slope of the FMCW signals generated by the transceiver 306 and by shifting the phase of the transmitted signals to the steering angles needed to cover the curvature of the road.

Objects are detected with radar system 300 by reflections or echoes that are received at the receive antennas 312 and 313. In some implementations, the received signaling is fed directly to the LNAs 341 and 342. The LNAs 341 and 342 are positioned between the receive antennas 312 and 313 and PS circuits 320 and 322, which include PSs similar to the PSs in PS circuits 316 and 318. In other implementations, the received signaling is then fed to couplers 372 and 373 using feedback calibration signaling from the transceiver 306. The couplers 370, 372-674 may allow probing to the receive chain signal path during a calibration process. From the couplers 372 and 373, the received signaling is fed to LNAs 341 and 342.

For receive operation, PS circuits 320 and 322 create phase differentials between radiating elements in the receive antennas 312 and 313 to compensate for the time delay of received signals between radiating elements due to spatial configurations. Receive phase-shifting, also referred to as analog beamforming, combines the received signals for aligning echoes to identify the location, or position of a detected object. That is, phase shifting aligns the received signals that arrive at different times at each of the radiating elements in receive antennas 312 and 313. Similar to PS circuits 316, 318 on the transmit chain, PS circuits 320, 322 are controlled by the DAC controller 390, which provides control signaling to each PS to generate the desired phase shift. In some respects, the FPGA 326 may provide bias voltages to the DAC controller 390 to generate the control signaling to PS circuits 320, 322.

The receive chain then combines the signals fed by the PS circuits 320 and 322 at the combination networks 344 and 345, respectively, from which the combined signals propagate to the amplifiers 364 and 366 for signal amplification. The amplified signal is then fed to the transceiver 306 for receiver processing. Note that as illustrated, the combination networks 344 and 345 may generate multiple combined signals 346 and 348, of which each signal combines signals from a number of elements in the receive antennas 312 and 313, respectively. In one example, the receive antennas 312 and 313 include 128 and 34 radiating elements partitioned into two 64-element and 32-element clusters, respectively. For example, the signaling fed from each cluster is combined in a corresponding combination network (e.g., 344, 345) and delivered to the transceiver 306 in a separate RF transmission line. In this respect, each of the combined signals 346 and 348 may carry two RF signals to the transceiver 306, where each RF signal combines signaling from the 64-element and 32-element clusters of the receive antennas 312 and 313. Other examples may include 8, 26, 64, or 32 elements, and so on, depending on the desired configuration. The higher the number of antenna elements, the narrower the beam width. In some implementations, the combination network 344 is coupled to the receive antennas 312 and the combination network 345 is coupled to receive antennas 313. In some respects, the receive guard antennas 310 and 314 feed the receiving signaling to couplers 370 and 374, respectively, which are then fed to LNAs 340 and 343. The filtered signals from the LNAs 340 and 343 are fed to amplifiers 323 and 324, respectively, which are then fed to the transceiver 306 for side lobe maycelation of the received signals by the receiver processing.

In some implementations, the radar module 302 includes receive guard antennas 310 and 314 that generate a radiation pattern separate from the main beams received by the 64-element receive antennas 312 and 313. The receive guard antennas 310 and 314 are implemented to effectively eliminate side-lobe returns from objects. The goal is for the receive guard antennas 310 and 314 to provide a gain that is higher than the side lobes and therefore enable their elimination or reduce their presence significantly. The receive guard antennas 310 and 314 effectively act as a side lobe filter. Similar, the radar module 302 includes transmit guard antennas 307 and 310 to eliminate side lobe formation or reduce the gain generated by transmitter side lobes at the time of a transmitter main beam formation by the transmit antennas 308 and 309.

Once the received signals are received by transceiver 306, the received signals are processed by processing engines 350. Processing engines 350 include perception engine 304 that detects and identifies objects in the received signal with one or more neural networks using machine learning or computer vision techniques, database 352 to store historical and other information for radar system 300, and the DSP engine 354 with an Analog-to-Digital Converter (ADC) module to convert the analog signals from transceiver 306 into digital signals that may be processed by a monopulse module (not shown) to determine AoA information for the localization, detection and identification of objects by perception engine 304. In one or more implementations, DSP engine 356 may be integrated with the microcontroller 338 or the transceiver 306.

Radar system 300 also includes a Graphical User Interface (GUI) 358 to enable configuration of scan parameters such as the total angle of the scanned area defining the FoV, the beam width or the scan angle of each incremental transmission beam, the number of chirps in the radar signal, the chirp time, the chirp slope, the chirp segment time, and so on as desired. In some implementations, the GUI 358 may provide for display a rendering of roadmap data that indicates range, velocity and AoA information for detected objects in the FoV. In some examples, the roadmap data may delineate between traffic moving toward the radar system 300 and traffic moving away (or receding from) the radar system 300 using a predetermined angular resolution (e.g., at or less than) 1.6° with angular precision based at least on the monopulse and/or guard channel detection techniques. In addition, radar system 300 has a temperature sensor 360 for sensing the temperature around the vehicle so that the proper voltages from FPGA 326 may be used to generate the desired phase shifts. The voltages stored in FPGA 326 are determined during calibration of the antennas under different operating conditions, including temperature conditions. A database 362 may also be used in radar system 300 to store radar and other useful data.

The radar data may be organized in sets of Range-Doppler (RD) map information, corresponding to four-dimensional (4D) information that is determined by each RF beam reflected from targets, such as azimuthal angles, elevation angles, range, and velocity. The RD maps may be extracted from FMCW radar signals and may contain both noise and systematic artifacts from Fourier analysis of the radar signals. The perception engine 304 controls further operation of the transmit antennas 308 and 309 by, for example, providing an antenna control signal containing beam parameters for the next RF beams to be radiated from cells in the transmit antennas 308.

In operation, the microcontroller 338 is responsible for directing the transmit antennas 308 and 309 to generate RF beams with determined parameters such as beam width, transmit angle, and so on. The microcontroller 338 may, for example, determine the parameters at the direction of perception engine 304, which may at any given time determine to focus on a specific area of a FoV upon identifying targets of interest in the ego vehicle's path or surrounding environment. The microcontroller 338 determines the direction, power, and other parameters of the RF beams and controls the transmit antennas 308 and 309 to achieve beam steering in various directions. The microcontroller 338 also determines a voltage matrix to apply to reactance control mechanisms coupled to the transmit antennas 308 and 309 to achieve a given phase shift. In some examples, the transmit antennas 308 and 309 are adapted to transmit a directional beam through active control of the reactance parameters of the individual cells that make up the transmit antennas 308 and 309.

Next, the transmit antennas 308 and 309 radiate RF beams having the determined parameters. The RF beams are reflected from targets in and around the ego vehicle's path (e.g., in a 360° field of view) and are received by the transceiver 306. The receive antennas 312 and 313 send the received 4D radar data to the perception engine 304 for target identification.

In various examples, the perception engine 304 may store information that describes an FoV. This information may be historical data used to track trends and anticipate behaviors and traffic conditions or may be instantaneous or real-time data that describes the FoV at a moment in time or over a window in time. The ability to store this data enables the perception engine 304 to make decisions that are strategically targeted at a particular point or area within the FoV. For example, the FoV may be clear (e.g., no echoes received) for a period of time (e.g., five minutes), and then one echo arrives from a specific region in the FoV; this is similar to detecting the front of a car. In response, the perception engine 304 may determine to narrow the beam width for a more focused view of that sector or area in the FoV. The next scan may indicate the targets' length or other dimension, and if the target is a vehicle, the perception engine 304 may consider what direction the target is moving and focus the beams on that area. Similarly, the echo may be from a spurious target, such as a bird, which is small and moving quickly out of the path of the vehicle. The database 352 coupled to the perception engine 304 may store useful data for radar system 300, such as, for example, information on which subarrays of the transmit antennas 308 and 309 perform better under different conditions.

In various examples described herein, the use of radar system 300 in an autonomous driving vehicle provides a reliable way to detect targets in difficult weather conditions. For example, historically a driver will slow down dramatically in thick fog, as the driving speed decreases along with decreases in visibility. On a highway in Europe, for example, where the speed limit is 130 km/h, a driver may need to slow down to 50 km/h when visibility is poor. Using the radar system 300, the driver (or driverless vehicle) may maintain the maximum safe speed without regard to the weather conditions. Even if other drivers slow down, a vehicle enabled with the radar system 300 may detect those slow-moving vehicles and obstacles in its path and avoid/navigate around them.

Additionally, in highly congested areas, it is necessary for an autonomous vehicle to detect targets in sufficient time to react and take action. The examples provided herein for a radar system increase the sweep time of a radar signal to detect any echoes in time to react. In rural areas and other areas with few obstacles during travel, the perception engine 304 adjusts the focus of the RF beam to a larger beam width, thereby enabling a faster scan of areas where there are few echoes. The perception engine 304 may detect this situation by evaluating the number of echoes received within a given time period and making beam size adjustments accordingly. Once a target is detected, the perception engine 304 determines how to adjust the beam focus. This is achieved by changing the specific configurations and conditions of the transmit antennas 308. In one example scenario, a subset of unit cells is configured as a subarray. This configuration means that this set may be treated as a single unit, and all the cells within the subarray are adjusted similarly. In another scenario, the subarray is changed to include a different number of unit cells, where the combination of unit cells in a subarray may be changed dynamically to adjust to conditions and operation of the radar system 300.

All of these detection scenarios, analysis and reactions may be stored in the perception engine 304, such as in the database 352, and used for later analysis or simplified reactions. For example, if there is an increase in the echoes received at a given time of day or on a specific highway, that information is fed into the microcontroller 338 to assist in proactive preparation and configuration of the transmit antennas 308 and 309. Additionally, there may be some subarray combinations that perform better, such as to achieve a desired result, and this is stored in the database 352.

Figure 4:
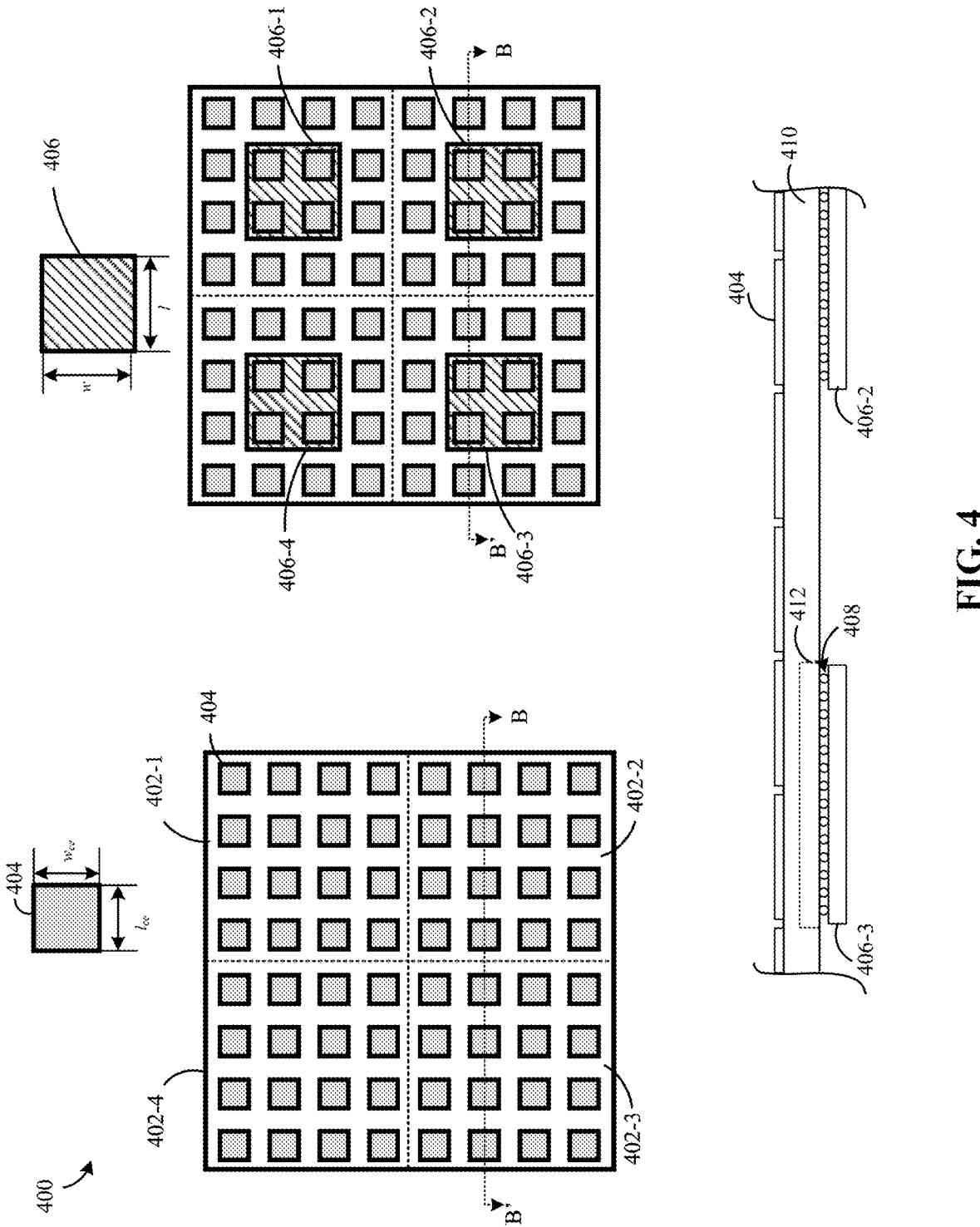
FIG. 4 illustrates a schematic diagram and a cross-sectional view of a beamformer integrated circuit package tile in accordance with one or more implementations of the subject technology.

FIG. 4 illustrates a schematic diagram of a beamformer integrated circuit package tile 400 in accordance with one or more implementations of the subject technology. The beamformer integrated circuit package tile 400 includes antenna elements, such as element 404, and Radio Frequency Integrated Circuits (RFICs) 406-1, 406-2, 406-3, 406-4. As illustrated on the top left drawing, the tile 400 has four sections, 402, and each section 402 includes a 4×4 array of elements 404. The elements 404 are defined by a length and width measure. In this example, the elements 404 are all similarly dimensioned, however, alternate examples may implement different sized, dimensioned, or shaped elements. In some implementations, the beamformer integrated circuit package tile 400 includes 64 antenna elements per tile, such that the tile includes a number of channels that corresponds to the number of antenna elements. In some respects, each tile 400 may be configured as a transmitter (TX) tile or a receiver (RX) tile, where the tile 400 as a transmitter tile includes 64 TX channels or as a receiver tile that includes 64 RX channels. The number of antenna elements may be determined in a variety of methods and for a variety of purposes for various implementations and applications. In some implementations, the beamformer integrated circuit package tile 400 includes four (4) 16 channel beamforming ICs 406 (e.g., RFICs 406-1, 406-2, 406-3, 406-4) per tile (based on a 64-element tile), but the number of channels per beamforming IC may vary depending on implementation. The top right drawing illustrates placement of the RFICs 406 with respect to the arrangement of antenna elements 404 and sections 402 of tile 400. The antenna elements 404 may be mounted to a first surface of the beamformer integrated circuit package tile 400 and the RFICs 406-1, 406-2, 406-3, 406-4 may be mounted to a second surface (opposite to the first surface) of the beamformer integrated circuit package tile 400, which will be described in more detail in FIG. 4.

The beamformer integrated circuit package tile 400 may be formed of a specific fabrication technology that allows for high interconnect density, compact routing networks and high frequency applications, such as millimeter wave applications. The beamformer integrated circuit package tile 400 may be an organic packaging-based tile with high precision PCB manufacturing. In some implementations, the beamformer integrated circuit package tile 400 is formed with a Low-Temperature Co-fired Ceramic (LTCC) substrate or package. In other implementations, the beamformer integrated circuit package tile 400 is formed with a Flip-Chip Ball Grid Array (FCBGA) package.

In some implementations, the RFICs 406-1, 406-2, 406-3, 406-4 include phase shifters for providing RF signals at multiple steering angles. The RFICs 406-1, 406-2, 406-3, 406-4 may include a phase shifting control module for providing phase shifting to transmission lines and is designed to mitigate parasitic effects on the transmission lines in some embodiments. As depicted in FIG. 4, the RFICs 406-1, 406-2, 406-3, 406-4 are respectively located in regions 402-1, 402-2, 402-3, 402-4 of the beamformer integrated circuit package tile 400. Each of the regions 402-1, 402-2, 402-3, 402-4 includes a subset of the antenna elements 404, where each corresponding RFIC provides phase shifting to the transmission lines coupled to the corresponding antenna elements in that region. In some examples, the beamformer integrated circuit package tile 400 with a 64-element arrangement may produce horizontal and vertical beamwidth of about 12.7 degrees.

In some implementations, each of the antenna elements 404 includes conductive printed elements, such as printed patches of different shapes. In some examples, the antenna elements 404 may be composed of microstrips, gaps, dipoles (e.g., parallel dipoles or cross dipoles), and so forth. The conductive printed elements may also have different configurations, such as a square patch, a rectangular patch, a dipole, multiple dipoles, and so on. Other shapes (e.g., trapezoid, hexagon, etc.) may also be designed to satisfy design criteria for a given millimeter wave application, such as the location of the beamformer integrated circuit package tile 400 relative to the roadway, the desired range and angular resolution performance, and so on. Various configurations, shapes, and dimensions may be used to implement specific designs and meet specific constraints.

As illustrated, beamformer integrated circuit package tile 400 is a rectangular active antenna array with a length l and a width w. For example, the beamformer integrated circuit package tile 400 includes the antenna element 404 that is a rectangular conductive printed patch with dimensions $w_{ce}$ and $l_{ce}$ for its width and length, respectively. The dimensions of the antenna element 404 may in the sub-wavelength range $$\left(\sim\frac{\lambda}{M}\right),$$

with λ indicating the wavelength of its operational RF signal and M being a positive integer. As described in more detail below, the design of the beamformer integrated circuit package tile 400 is driven by geometrical considerations for a given application. The dimensions, shape, and cell configuration of the beamformer integrated circuit package tile 400 will therefore depend on the application.

In FIG. 4, the cross-sectional view of the beamformer integrated circuit package tile 400 is taken along the B-B' axis. The beamformer integrated circuit package tile 400 includes a substrate 410 with the antenna elements patterned on a top surface of the substrate 410. The RFICs 406-2 and 406-3 are coupled to a bottom surface of the substrate 410 with conductive fasteners 408. In some respects, the conductive fasteners 408 include solder balls, solder bumps, micro bumps, or the like, for fastening the RFICs 406-2 and 406-3 to the substrate 410 with soldered connections.

In some implementations, the substrate 410 includes a cavity 412 for receiving a RFIC package (e.g., RFIC 406-3) such that the RFIC package 406 is coupled to an inner surface of the cavity 412. In some respects, the RFIC 406 package may be fastened to the inner surface of the cavity 412 through soldered connections. In other respects, the cavity may be filled with a resin adhesive to bond the RFIC package 406 to the substrate 410. In this respect, by having the RFIC package 406 inside the cavity 412, the package height of the beamformer integrated circuit package tile 400 is reduced.

Figure 5:
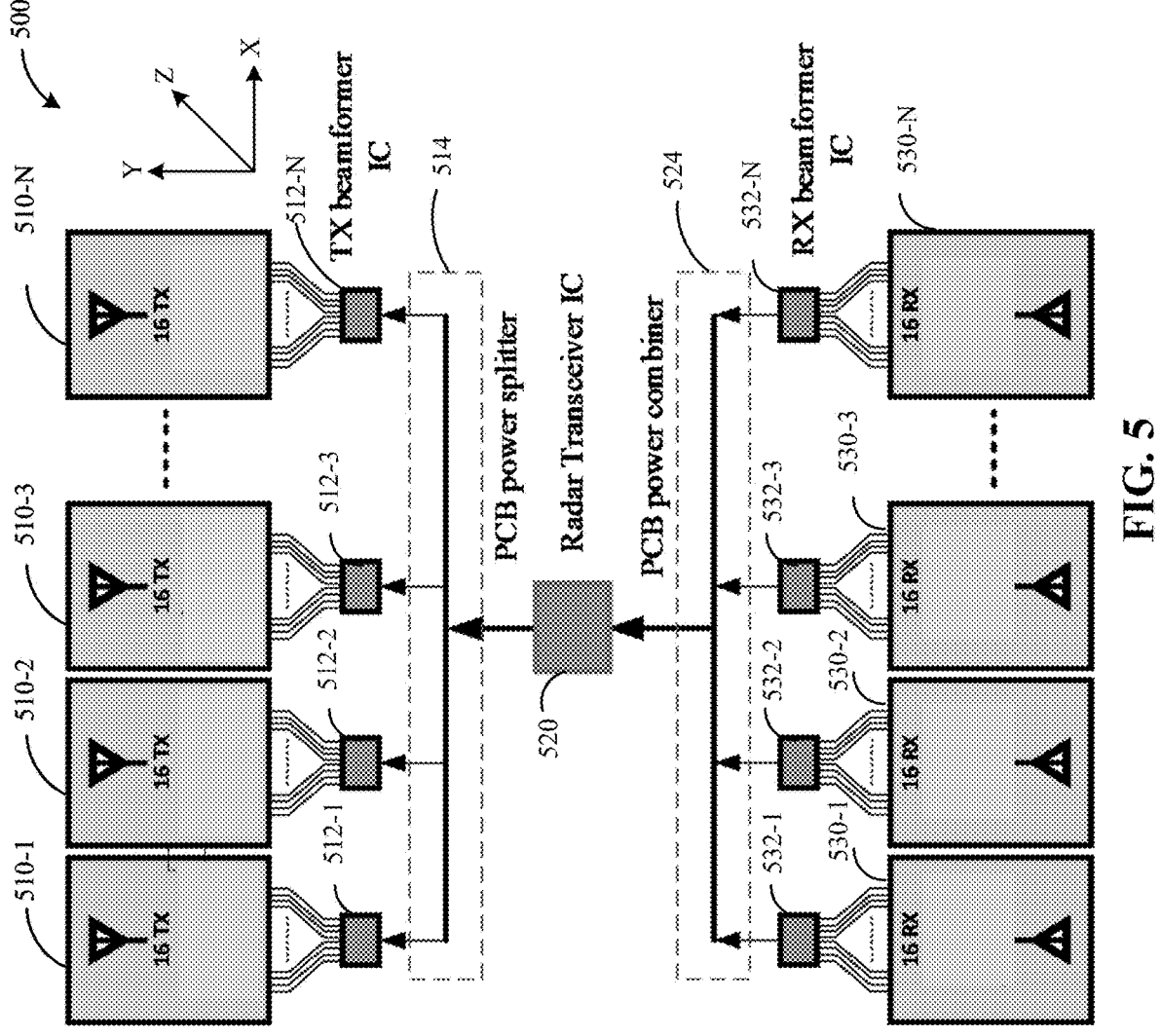
FIG. 5 illustrates a schematic diagram of a phased array radar system in accordance with one or more implementations of the subject technology.

FIG. 5 illustrates a schematic diagram of a phased array radar system 500 in accordance with one or more implementations of the subject technology. The phased array radar system 500 includes transmitter antenna modules 510-1, 510-2, 510-3, through 510-N, transmit beamformer ICs 512-1, 512-2, 512-3 through 512-N, a power splitter 514, a radar transceiver IC 520, a power combiner 524, receiver antenna modules 530-1, 530-2, 530-3, through 530-N, receive beamformer ICs 532-1, 532-2, 532-3 through 532-N. There may be any number of antenna modules 510; in the present example these are labeled as 1 though N. The elements are radiating elements fed by transceiver 520 for transmit and fed to the transceiver IC 520 from the received signal at antennas 530. Alternate embodiments may other components including those illustrated in this example as well as other components in various configurations. Variations in the arrangement and type of the components may be made without departing from the scope of the claims as set forth herein.

The transmitter antenna modules 510-1, 510-2, 510-3, through 510-N are respectively coupled to the transmit beamformer ICs 512-1, 512-2, 512-3 through 512-N through a multi-channel interface. In some respects, each of the transmitter antenna modules 510-1, 510-2, 510-3, through 510-N may include multiple antennas, such as 16 antennas. The transmit beamformer ICs 512-1, 512-2, 512-3 through 512-N are coupled to the power splitter 514. In some respects, the power splitter 514 includes a corporate feed network patterned on a Printed Circuit Board (PCB) for distributing a single source input into multiple output signals at respective power levels. The power splitter 514 is coupled to the radar transceiver IC 520. The radar transceiver IC 520 is coupled to the power combiner 524. In some respects, the power combiner 524 includes a corporate feed network patterned on PCB for combining multiple input signals at respective power levels into a single destination output. The power combiner 524 is coupled to the receive beamformer ICs 532-1, 532-2, 532-3 through 532-N. The receive beamformer ICs 532-1, 532-2, 532-3 through 532-N are respectively coupled to the receiver antenna modules 530-1, 530-2, 530-3, through 530-N.

In some implementations, each of the transmitter antenna modules 510-1, 510-2, 510-3, through 510-N includes a substrate (not shown) having multiple conductive layers and a dielectric layer sandwiched therebetween. In various examples, each of the transmitter antenna modules 510-1, 510-2, 510-3, through 510-N is configured as elements that are arranged along the x-direction of the phased array radar system 500, in which each element includes a plurality of slots or discontinuities in the conductive layer proximate antenna elements of the respective transmitter antenna. A signal is provided to each of the elements that radiates through the slots in the elements and feeds the antenna elements in the transmitter antenna. The various elements may be fed with signals of different phase, thus providing phase shifting in the y-direction, while the respective transmitter antenna may be controlled so as to shift the phase of the transmission signal in the y-direction and/or the x-direction, while the signal transmits in the z-direction.

Alike the transmitter antenna modules 510-1, 510-2, 510-3, through 510-N, each of the receiver antenna modules 530-1, 530-2, 530-3, through 530-N includes a substrate (not shown) having multiple conductive layers and a dielectric layer sandwiched therebetween. In various examples, each of the receiver antenna modules 530-1, 530-2, 530-3, through 530-N is configured as elements that are arranged along the x-direction of the phased array radar system 500, in which each element includes a plurality of slots or discontinuities in the conductive layer proximate antenna elements of the respective receiver antenna. A signal is received at the antenna elements in the receiver antenna, which is then provided to each of the elements that radiates through the slots in the elements and feeds the receive beamformer ICs 532-1, 532-2, 532-3 through 532-N for phase shifting the incoming RF signaling.

Figure 6:
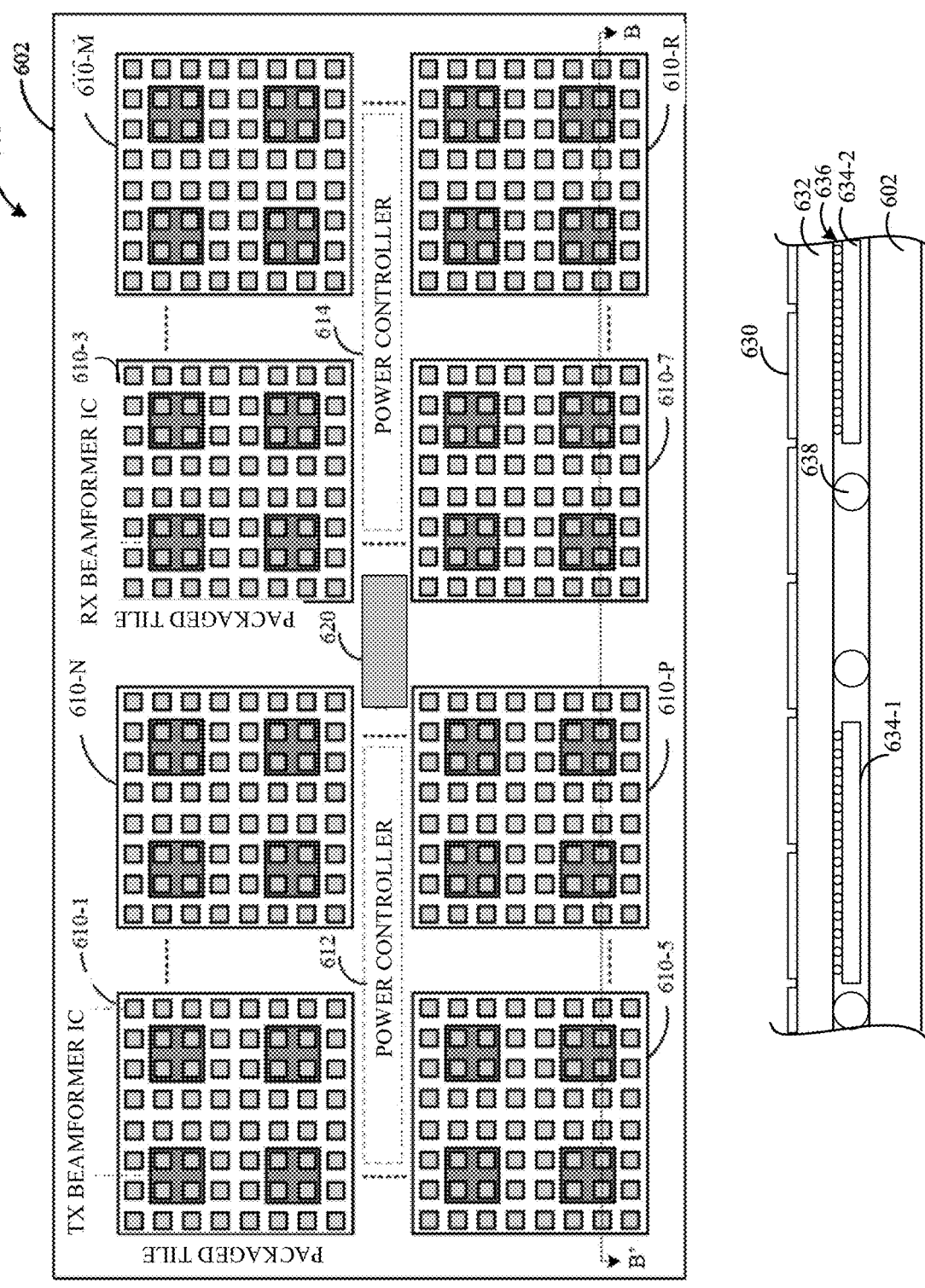
FIG. 6 illustrates a schematic diagram and cross-sectional view of a first example of a multi-dimensional phased array radar system with beamformer integrated circuit package tiles in accordance with one or more implementations of the subject technology.

FIG. 6 illustrates a schematic diagram of a first example of multi-dimensional, such as a two-dimensional (2D), phased array radar system 600 with beamformer integrated circuit package tiles in accordance with one or more implementations of the subject technology. The phased array radar system 600 includes a carrier board 602, beamformer integrated circuit package tiles 610-1, 610-2, 610-3, 610-4, 610-5, 610-6, 610-7, 610-8, a power splitter network 612, a power combiner network 614, and radar transceiver 620. Not all of the depicted components may be implemented, however, and one or more implementations may include additional components not shown in the figure. Variations in the arrangement and type of the components may be made without departing from the scope of the claims as set forth herein. Additional components, different components, or fewer components may be provided.

The carrier board 602 includes the beamformer integrated circuit package tiles illustrated by tiles 610, including 610-1 to 610-N, 610-3 to 610-M, 610-5 to 610-P, 610-7 to 610-R arranged as an array on the carrier board 602. As depicted in FIG. 6, the beamformer integrated circuit package tiles 610-1 to 610-N, and 610-5 to 610-P are configured as transmitter antennas and the beamformer integrated circuit package tiles 610-3 to 610-M, and 610-7 to 610-R are configured as receiver antennas. In this respect, the beamformer integrated circuit package tiles 610-1 to 610-N, and 610-5 to 610-P receive the outgoing millimeter wave RF signaling from the radar transceiver 620 through the power splitter network 612 for transmission and the beamformer integrated circuit package tiles 610-3 to 610-M and 610-7 to 610-R convey the incoming millimeter wave RF signaling to the radar transceiver 620 through the power combiner network 614 for receiver processing.

In some implementations, the carrier board 602 is a PCB. In other implementations, the carrier board 602 is a Printed Wiring Board (PWB). The carrier board 602 is a multi-layer board with one or more conductive planes and one or more isolation planes. The carrier board 602 may include vias, such as Through-Silicon Vias (TSVs), for routing signaling through the multiple layers of the carrier board 602. For example, the signaling between the radar transceiver 620 and each of the beamformer integrated circuit package tiles may be carried through routing in one or more layers of the carrier board 602.

In some implementation, the phased array radar system 600 includes a first number of tiles for transmitter operation and a second number of tiles for receiver operation. For example, the phased array radar system 600 may include 144 tiles for transmitter operation and 144 tiles for receiver operation. By having 64 antenna elements in each tile, the phased array radar system 600 may have 96×96 elements for either the transmitter array or the receiver array. The spacing between each tile is smaller than the wavelength such that grating lobes immunity is achieved. In some respects, the distance between each tile arranged on the carrier board 602 may corresponds to a desired minimum distance set by any design rules or may be small enough to be considered a negligible distance. In other respects, the beamformer integrated circuit package tiles 610-1 to 610-N, 610-3 to 610-N, 610-5 to 610-P, 610-7 to 610-R may be in physical contact with one another on the carrier board 602.

In some examples, the transmitter array and the receiver array may have dimensions of about 187 mm×187 mm at an operational frequency of 77 GHz. The transmitter array may have power consumption of about 921 Watts (W), whereas the receiver array may have power consumption of about 552 W. The phased array radar system 600 of the present example has a horizontal FoV of ±90° with angular resolution of about 1° and a vertical FoV of ±90° with angular resolution of about 1°. In other examples, the phased array radar system 600 may include 48 tiles for transmitter operation and 48 tiles for receiver operation. By having 64 antenna elements in each tile, the phased array radar system 600 may have 96×32 elements for either the transmitter array or the receiver array. In some respects, the transmitter array and the receiver array may have dimensions of about 187 mm×62 mm at an operational frequency of 77 GHz. The transmitter array may have power consumption of about 300 W, whereas the receiver array may have power consumption of about 184 W. The phased array radar system 600 has a horizontal FoV of ±90° with angular resolution of about 1° and a vertical FoV of ±90° with angular resolution of about 3.2°. The dimensions of each tile may vary from the examples above and may be limited to the operational frequency and desired beamwidth.

In FIG. 6, the cross-sectional view of the beamformer integrated circuit package tile 600 is taken along the B-B' axis. The beamformer integrated circuit package tile 600 includes a substrate 632 with antenna elements 630 patterned on a top surface of the substrate 632. The RFICs 634-1 and 634-2 are coupled to a bottom surface of the substrate 632 with conductive fasteners 636. The substrate 632 is coupled to the carrier board 602 with conductive fasteners 638. In some respects, the conductive fasteners 638 are solder balls or solder bumps for forming soldered connections. The conductive fasteners 638 are larger in size and have a larger pitch than that of the conductive fasteners 636. In some respects, the height of the conductive fasteners 638 forms a gap between the bottom surface of the substrate 632 and a top surface of the carrier board 602 that is large enough to receive an RFIC package (e.g., RFIC 634-1). The gap may remain as an open-air gap after assembly in some implementations or may be filled in with an epoxy material to encapsulate the RFIC package between the carrier board 602 and the substrate 632 in other implementations.

Figure 7:
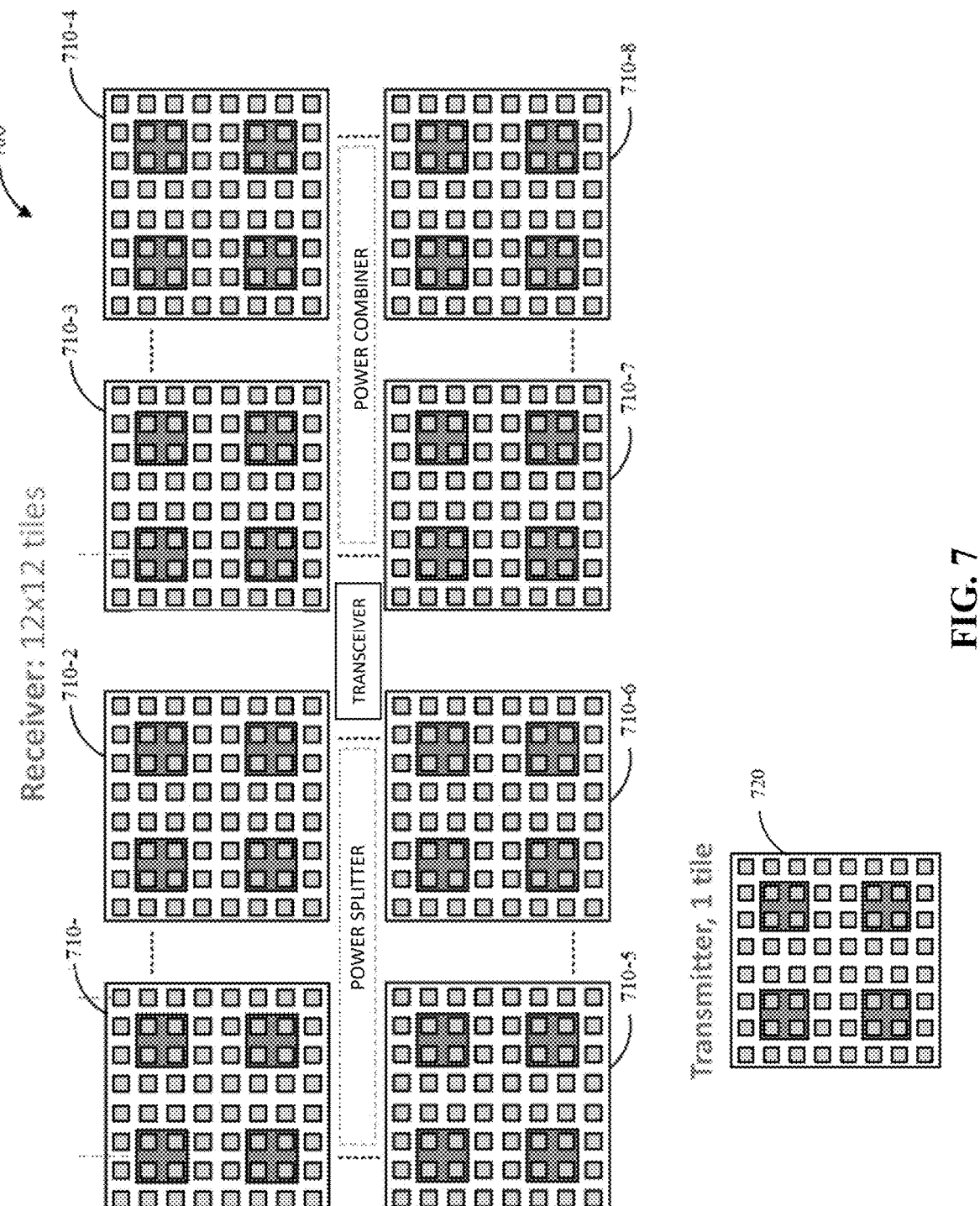
FIG. 7 illustrates a schematic diagram of a second example of a multi-dimensional phased array radar system with beamformer integrated circuit package tiles in accordance with one or more implementations of the subject technology.

FIG. 7 illustrates a schematic diagram of a second example of a phased array radar system 700 with beamformer integrated circuit package tiles in accordance with one or more implementations of the subject technology. The phased array radar system 700 includes beamformer integrated circuit package tiles 710-1, 710-2, 710-3, 710-4, 710-5, 710-6, 710-7, 710-8 and 720. The phased array radar system 700 represents a modified phase array for an automotive radar applications. In this respect, the phased array radar system 700 includes only one (1) beamformer integrated circuit package tile (e.g., 720) that operates as a transmitter antenna and 144 beamformer integrated circuit package tiles (e.g., 710-1, 710-2, 710-3, 710-4, 710-5, 710-6, 710-7, 710-8) arranged as an array of 12×12 tiles that operate as receiver antennas. In some respects, each of the beamformer integrated circuit package tiles 710-1, 710-2, 710-3, 710-4, 710-5, 710-6, 710-7, 710-8 and 720 has dimensions of about 15.5 mm×15.5 mm, such that the transmitter array has dimensions of about 15.5 mm×15.5 mm at the operational frequency of 77 GHz and the receiver array has dimensions of about 187 mm×187 mm at the operational frequency of 77 GHz. The transmitter array may have power consumption of about 16 W, whereas the receiver array may have power consumption of about 552 W. The phased array radar system 700 has a horizontal FOV of ±90° with angular resolution of about 1° and a vertical FoV of ±90° with angular resolution of about 1°.

Figure 8:
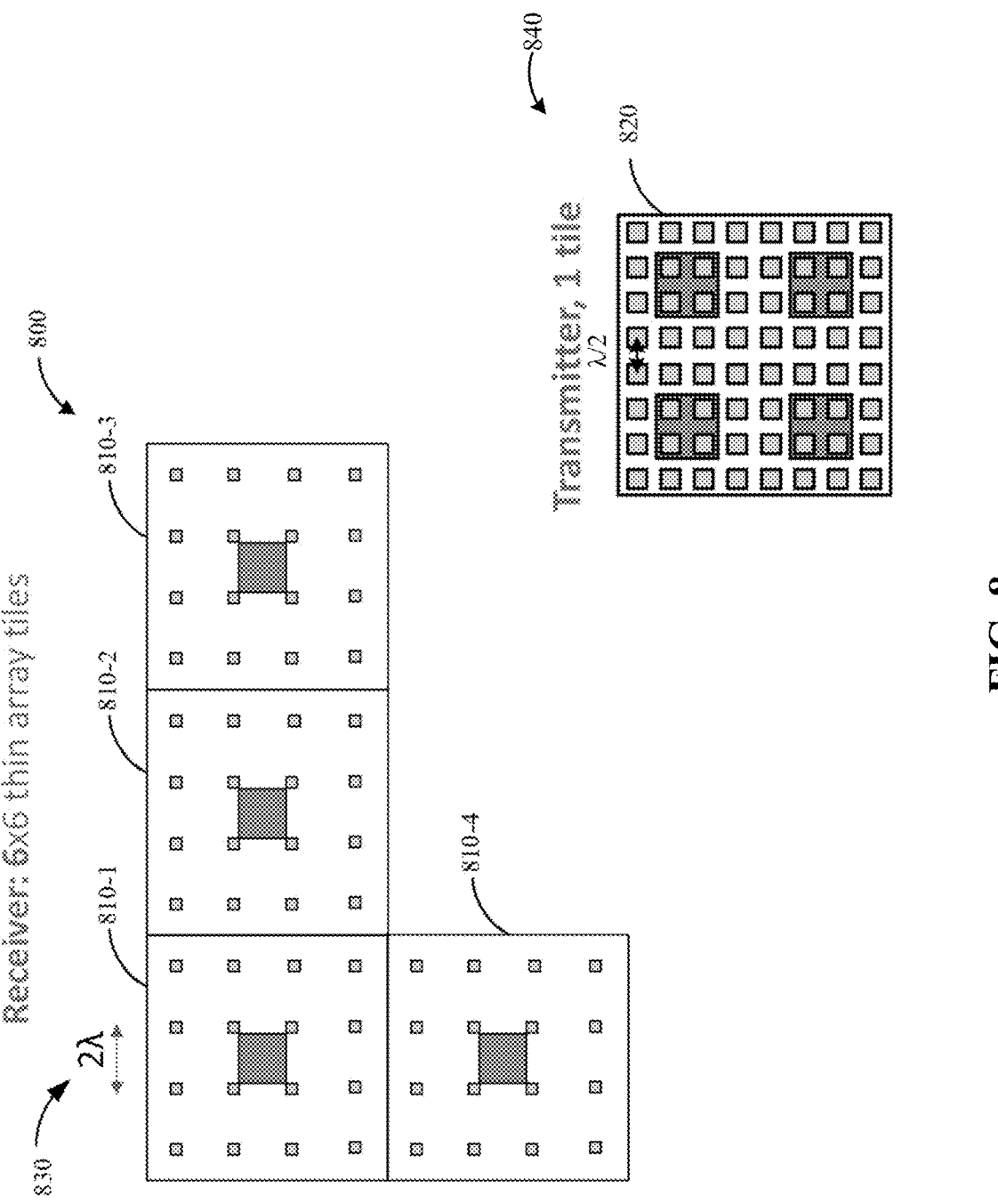
FIG. 8 illustrates a schematic diagram of a third example of a multi-dimensional phased array radar system with beamformer integrated circuit package tiles in accordance with one or more implementations of the subject technology.

FIG. 8 illustrates a schematic diagram of a third example of a phased array radar system 800 with beamformer integrated circuit package tiles in accordance with one or more implementations of the subject technology. The phased array radar system 800 includes beamformer integrated circuit package tiles 810-1, 810-2, 810-3, 810-4 and 820. As depicted in FIG. 8, the phased array radar system 800 includes only one (1) beamformer integrated circuit package tile (e.g., 820) that operates as a transmitter antenna and four (4) beamformer integrated circuit package tiles (e.g., 810-1, 810-2, 810-3, 810-4) arranged as an array of 6×6 tiles that operate as receiver antennas. Each of the beamformer integrated circuit package tiles 810-1, 810-2, 810-3, 810-4 includes sixteen (16) antenna elements, whereas the beamformer integrated circuit package tile 820 includes 64 antenna elements. In some implementations, each of the beamformer integrated circuit package tiles 810-1, 810-2, 810-3, 810-4 includes an element pitch size (or antenna element spacing) of about 2λ (e.g., 830), whereas the beamformer integrated circuit package tile 820 has an element pitch size or about $$\frac{\lambda}{2}$$

(e.g., 840). By having 16 antenna elements in each receiver tile, the phased array radar system 600 may have 36 tiles in the receiver array to achieve the desired beamwidth and angular resolution in the receiver operation.

In some respects, each of the beamformer integrated circuit package tiles 810-1, 810-2, 810-3, 810-4 and 820 has dimensions of about 15.5 mm×15.5 mm, such that the transmitter array has dimensions of about 15.5 mm×15.5 mm at the operational frequency of 77 GHz and the receiver array has dimensions of about 187 mm×187 mm at the operational frequency of 77 GHz. The transmitter array may have power consumption of about 16 W, whereas the receiver array may have power consumption of about 34.5 W. The phased array radar system 800 has a horizontal FoV of ±20° with angular resolution of about 1° and a vertical FoV of ±20° with angular resolution of about 1°.

Figure 9:
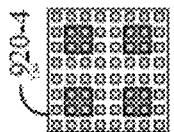
FIG. 9 illustrates a schematic diagram of a first example of a multi-dimensional hybrid Multiple-In-Multiple-Out (MIMO) phased array system with beamformer integrated circuit package tiles in accordance with one or more implementations of the subject technology.
Figure 9:
Figure 9:
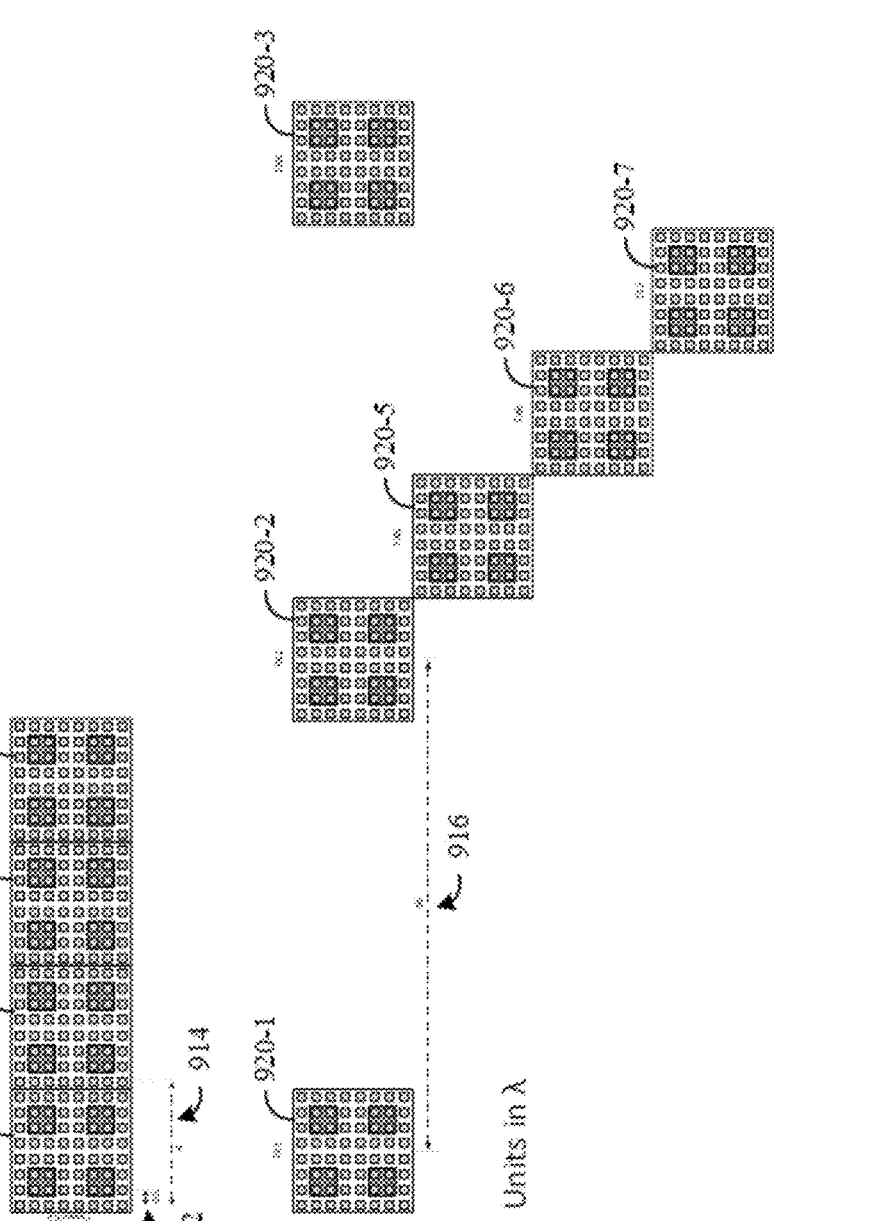

FIG. 9 illustrates a schematic diagram of a first example of a hybrid Multiple-In-Multiple-Out (MIMO) phased array system 900 with beamformer integrated circuit package tiles in accordance with one or more implementations of the subject technology. The hybrid MIMO phased array system 900 includes beamformer integrated circuit package tiles 910-1, 910-2, 910-3, 910-4 and beamformer integrated circuit package tiles 920-1, 920-2, 920-3, 920-4, 920-5, 920-6, 920-7. Alternate embodiments may implement a subset of the components illustrated, and one or more implementations may include additional components not shown in the figure. Variations in the arrangement and type of the components may be made without departing from the scope of the claims as set forth herein. Additional components, different components, or fewer components may be provided.

MIMO radar technology has emerged as a leading contender for advanced communication systems, including those being designed for millimeter wave applications in the 30 GHz to 300 GHz frequency spectrum. A MIMO radar employs multiple transmit antennas and has the ability to jointly process signals received at multiple receive antennas. Each transmit antenna transmits an independent waveform, which enables the MIMO radar to exploit increased degrees of freedom at the transmit array to improve resolution, flexibility, and adaptivity in comparison to conventional phase-array systems. Phase-array systems already possess several advantages over classical radar antennas based on their mechanical steering abilities with a wide. During the last years new array antenna designs have been proposed and developed, including virtualization of radiating elements in receive mode. There have been several different ways to create virtual arrays and the main such techniques may be in two categories. The first one consists of creating duplicated receiver arrays using specifically placed multiple transmit antennas in MIMO configurations, which is also known as active virtual arrays. The second one, referred to as passive virtual arrays, create virtual receive arrays using a pair or multiple receiving antenna elements according to a specific geometry. In this category, a highly useful technique is to create virtual arrays from physical receive arrays using interpolation.

The beamformer integrated circuit package tiles 910-1, 910-2, 910-3, 910-4 are arranged laterally along a first axis with a minimum physical spacing between each tile, where the spacing may be negligible. In some implementations, the element pitch in each tile is about (e.g., 912) and the pitch between the first column of elements of each tile is about 4λ (e.g., 914). The beamformer integrated circuit package tiles 920-1, 920-2, 920-3, 920-4 are arranged laterally along the first axis with a physical spacing of about 16λ between each tile (e.g., 916). The beamformer integrated circuit package tiles 920-5, 920-6, 920-7 are arranged diagonally (e.g., left-to-right) relative to the first axis (or in a staggered arrangement along a second axis orthogonal to the first axis) from the beamformer integrated circuit package tiles 920-2. In some implementations, the beamformer integrated circuit package tiles 920-5, 920-6, 920-7 are arranged diagonally from any one of the beamformer integrated circuit package tiles 920-1, 920-2, 920-3, 920-4 depending on implementation. Note that the multiple transmit antennas (e.g., 920-1, 920-2, 920-3, 920-4, 920-5, 920-6, 920-7) and the multiple receive antennas (e.g., 910-1, 910-2, 910-3, 910-4) may synthesize a virtual antenna array (not shown) having N×M receive arrays, where N is the number of transmit antennas and M is the number of receiving elements.

Each of the beamformer integrated circuit package tiles 910-1, 910-2, 910-3, 910-4, 920-1, 920-2, 920-3, 920-4, 920-5, 920-6, 920-7 includes 64 antenna elements. In some respects, the hybrid MIMO phased array system 900 has dimensions of about 202 mm×93.5 mm at the operational frequency of 77 GHz. The hybrid MIMO phased array system 900 may have a total power consumption of about 127 W. The hybrid MIMO phased array system 900 has a horizontal FoV of ±7° with at least an angular resolution of about 0.9° and a vertical FoV of ±7° with at least an angular resolution of about 3.5°. In some respects, the FoV ($\theta_{FOV}$) may be expressed as $$\pm \sin^{-1} \frac{\lambda}{2d},$$

where d is 4λ. In some respects, the minimum angular resolution may be expressed as $$\Delta\theta > \frac{\lambda}{Nd\cos\theta}.$$

Figure 10:
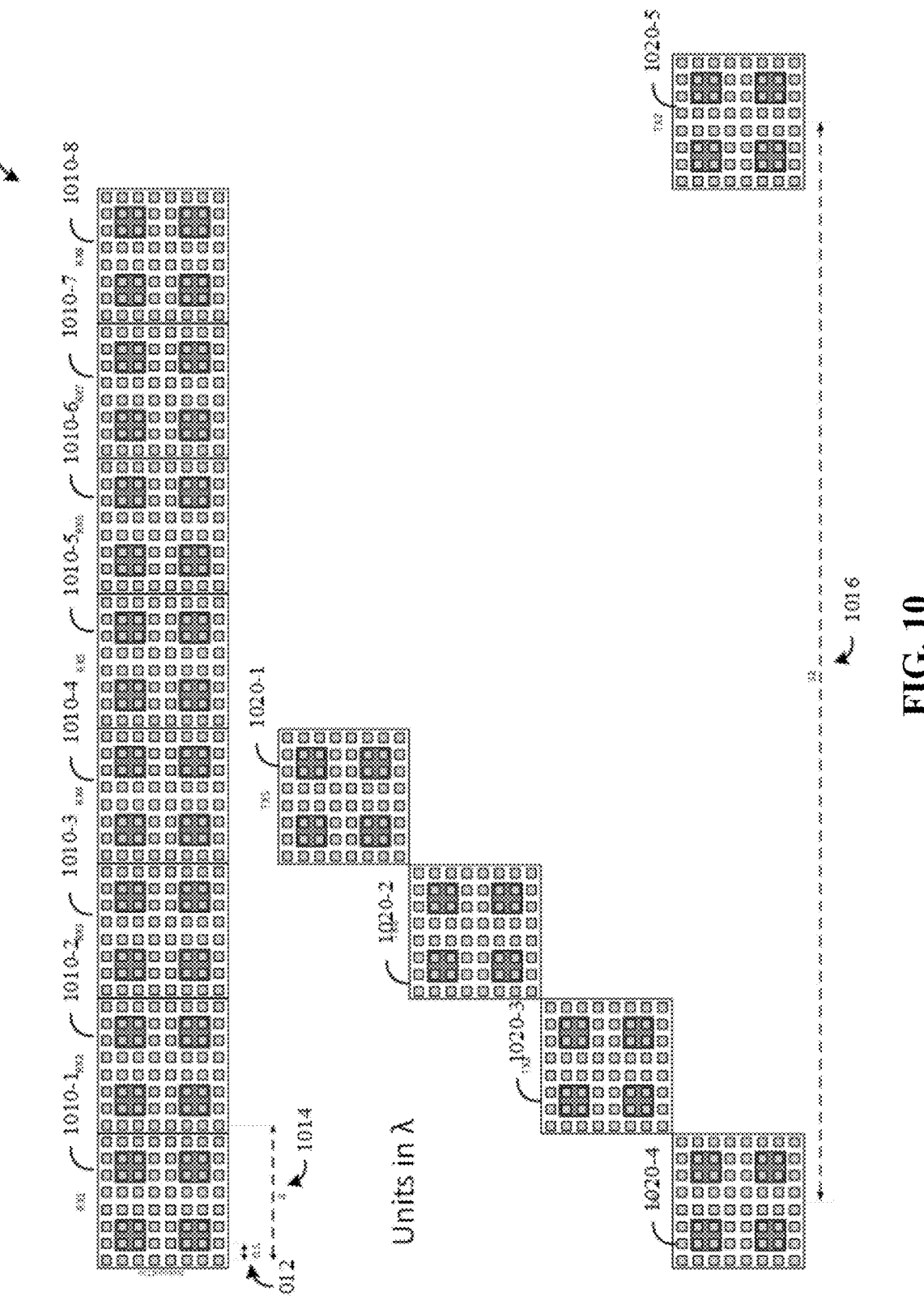
FIG. 10 illustrates a schematic diagram of a second example of a multi-dimensional hybrid MIMO phased array system with beamformer integrated circuit package tiles in accordance with one or more implementations of the subject technology.

FIG. 10 illustrates a schematic diagram of a second example of a hybrid MIMO phased array system 1000 with beamformer integrated circuit package tiles in accordance with one or more implementations of the subject technology. The hybrid MIMO phased array system 1000 includes beamformer integrated circuit package tiles 1010-1, 1010-2, 1010-3, 1010-4, 1010-5, 1010-6, 1010-7, 1010-8 and beamformer integrated circuit package tiles 1020-1, 1020-2, 1020-3, 1020-4, 1020-5. One or more implementations may include a subset of the illustrated components or additional components not shown in the figure. Variations in the arrangement and type of the components may be made without departing from the scope of the claims as set forth herein. Additional components, different components, or fewer components may be provided.

The beamformer integrated circuit package tiles 1010-1, 1010-2, 1010-3, 1010-4, 1010-5, 1010-6, 1010-7, 1010-8 are arranged laterally along a first axis with a minimum physical spacing between each tile, where the spacing may be negligible. In some implementations, the element pitch in each tile is about $$\frac{\lambda}{2}$$

(e.g., 1012) and the pitch between the first column of elements of each tile is about 4λ (e.g., 1014). The beamformer integrated circuit package tiles 1020-1, 1020-2, 1020-3, 1020-4 are arranged diagonally (e.g., right-to-left) relative to the first axis (or in a staggered arrangement along a second axis orthogonal to the first axis) from the beamformer integrated circuit package tile 1020-1. In some respects, the beamformer integrated circuit package tile 1020-1 is arranged laterally from the beamformer integrated circuit package tile 1020-4 along the second axis (with separation at a predetermined distance). The beamformer integrated circuit package tiles 1020-4 and 1020-5 are arranged laterally along the first axis with a physical spacing of about 32λ between each tile (e.g., 1016). In some implementations, the beamformer integrated circuit package tiles 1020-1, 1020-2, 1020-3, 1020-4 are arranged diagonally from a location that corresponds laterally from any one of the beamformer integrated circuit package tiles 1010-1, 1010-2, 1010-3, 1010-4, 1010-5, 1010-6, 1010-7, 1010-8 depending on implementation. Note that the multiple transmit antennas (e.g., 1020-1, 1020-2, 1020-3, 1020-4, 1020-5) and the multiple receive antennas (e.g., 1010-1, 1010-2, 1010-3, 1010-4, 1010-5, 1010-6, 1010-7, 1010-8) may synthesize a virtual antenna array (not shown) having N×M receive arrays, where N is the number of transmit antennas and M is the number of receiving elements.

Each of the beamformer integrated circuit package tiles 1010-1, 1010-2, 1010-3, 1010-4, 1010-5, 1010-6, 1010-7, 1010-8, 1020-1, 1020-2, 1020-3, 1020-4, 1020-5 includes 64 antenna elements. In some respects, the hybrid MIMO phased array system 1000 has dimensions of about 140 mm×93.5 mm at the operational frequency of 77 GHz. The hybrid MIMO phased array system 1000 may have a total power consumption of about 110 W. The hybrid MIMO phased array system 1000 has a horizontal FoV of ±7° with at least an angular resolution of about 0.9° and a vertical FoV of ±7° with at least an angular resolution of about 3.5°.

Figure 11:
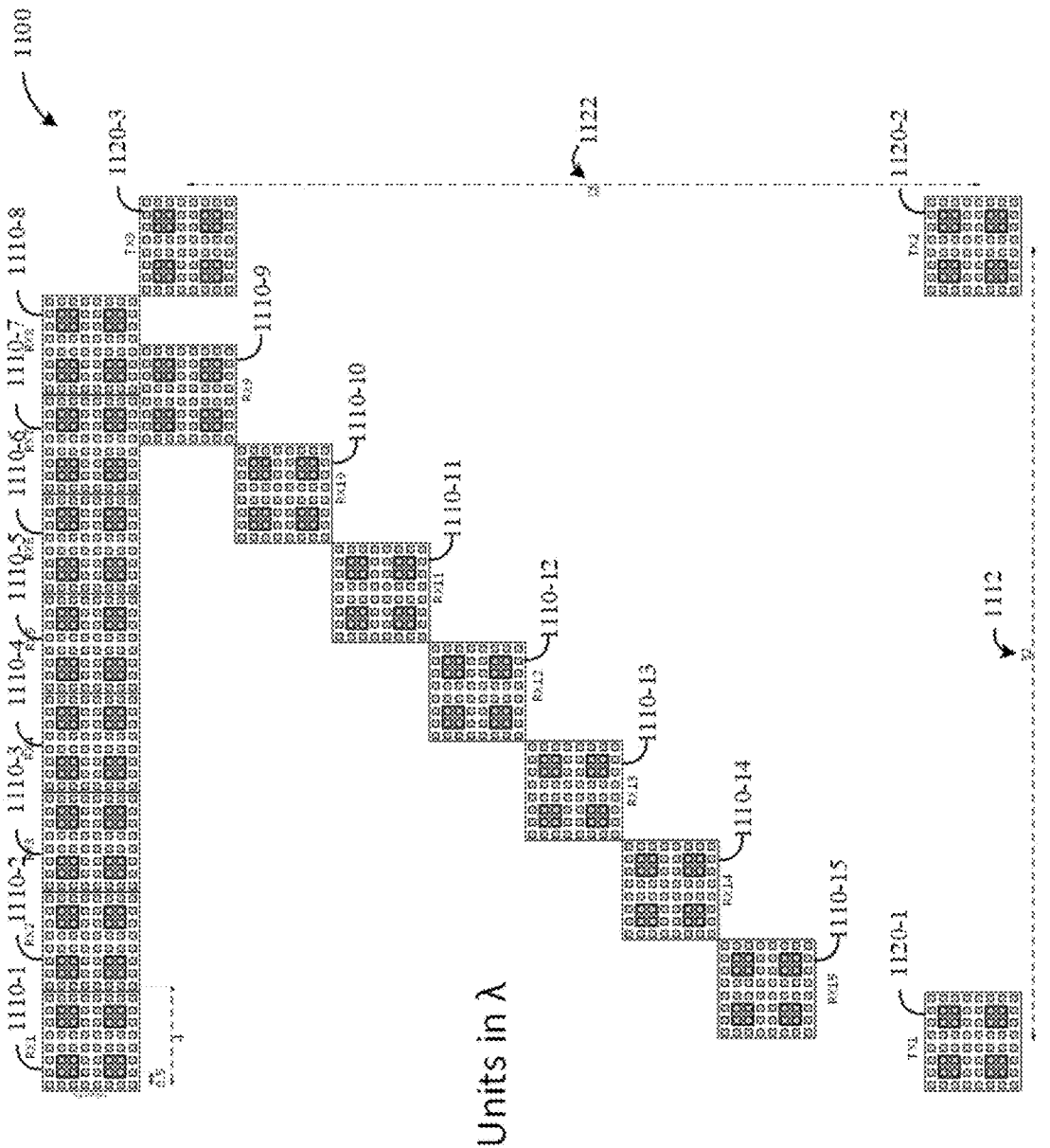
FIG. 11 illustrates a schematic diagram of a third example of a multi-dimensional hybrid MIMO phased array system with beamformer integrated circuit package tiles in accordance with one or more implementations of the subject technology.

FIG. 11 illustrates a schematic diagram of a third example of a hybrid MIMO phased array system 1100 with beamformer integrated circuit package tiles in accordance with one or more implementations of the subject technology. The hybrid MIMO phased array system 1100 includes beamformer integrated circuit package tiles 1110-1, 1110-2, 1110-3, 1110-4, 1110-5, 1110-6, 1110-7, 1110-8, 1110-9, 1110-10, 1110-11, 1110-12, 1110-13, 1110-14, 1110-15 and beamformer integrated circuit package tiles 1120-1, 1120-2, 1120-3. One or more implementations may include a subset of the depicted components or additional components not shown in the figure. Variations in the arrangement and type of the components may be made without departing from the scope of the claims as set forth herein. Additional components, different components, or fewer components may be provided.

The beamformer integrated circuit package tiles 1110-1, 1110-2, 1110-3, 1110-4, 1110-5, 1110-6, 1110-7, 1110-8 are arranged laterally along a first axis with a minimum physical spacing between each tile, where the spacing may be negligible. In some implementations, the element pitch in each tile is about $$\frac{\lambda}{2}$$

(e.g., 1112) and the pitch between the first column of elements of each tile is about 4λ (e.g., 1114). The beamformer integrated circuit package tiles 1110-9, 1110-10, 1110-11, 1110-12, 1110-13, 1110-14, 1110-15 are arranged diagonally (e.g., right-to-left) relative to the first axis (or in a staggered arrangement along a second axis orthogonal to the first axis) from the beamformer integrated circuit package tiles 1110-7 and 1110-8. In some respects, the beamformer integrated circuit package tile 1110-9 is arranged laterally from one or more of the beamformer integrated circuit package tiles 1110-7 and 1110-8 along the second axis (with separation at a predetermined distance). The beamformer integrated circuit package tiles 1120-1 and 1120-2 are arranged laterally along the first axis with a physical spacing of about 32λ between each tile (e.g., 1112). The beamformer integrated circuit package tile 1120-3 is arranged laterally along the second axis with a physical spacing of about 32λ from the beamformer integrated circuit package tile 1120-2 (e.g., 1122). In some respects, the beamformer integrated circuit package tile 1120-3 is arranged proximate to and diagonal (e.g., left-to-right) of the beamformer integrated circuit package tile 1110-8. In some respects, the beamformer integrated circuit package tile 1120-3 is arranged proximate to and lateral from the beamformer integrated circuit package tile 1110-15 along the second axis. Note that the multiple transmit antennas (e.g., 1120-1, 1120-2, 1120-3) and the multiple receive antennas (e.g., 1110-1, 1110-2, 1110-3, 1110-4, 1110-5, 1110-6, 1110-7, 1110-8, 1110-9, 1110-10, 1110-11, 1110-12, 1110-13, 1110-14, 1110-15) may synthesize a virtual antenna array (not shown) having N×M receive arrays, where N is the number of transmit antennas and M is the number of receiving elements.

Each of the beamformer integrated circuit package tiles 1110-1, 1110-2, 1110-3, 1110-4, 1110-5, 1110-6, 1110-7, 1110-8, 1110-9, 1110-10, 1110-11, 1110-12, 1110-13, 1110-14, 1110-15, 1120-1, 1120-2, 1120-3 includes 64 antenna elements. In some respects, the hybrid MIMO phased array system 1100 has dimensions of about 140 mm×140 mm at the operational frequency of 77 GHz. The hybrid MIMO phased array system 1100 may have a total power consumption of about 105.6 W. The hybrid MIMO phased array system 1100 has a horizontal FoV of ±7° with at least an angular resolution of about 0.9° and a vertical FoV of ±7° with at least an angular resolution of about 0.9°.

Figure 12:
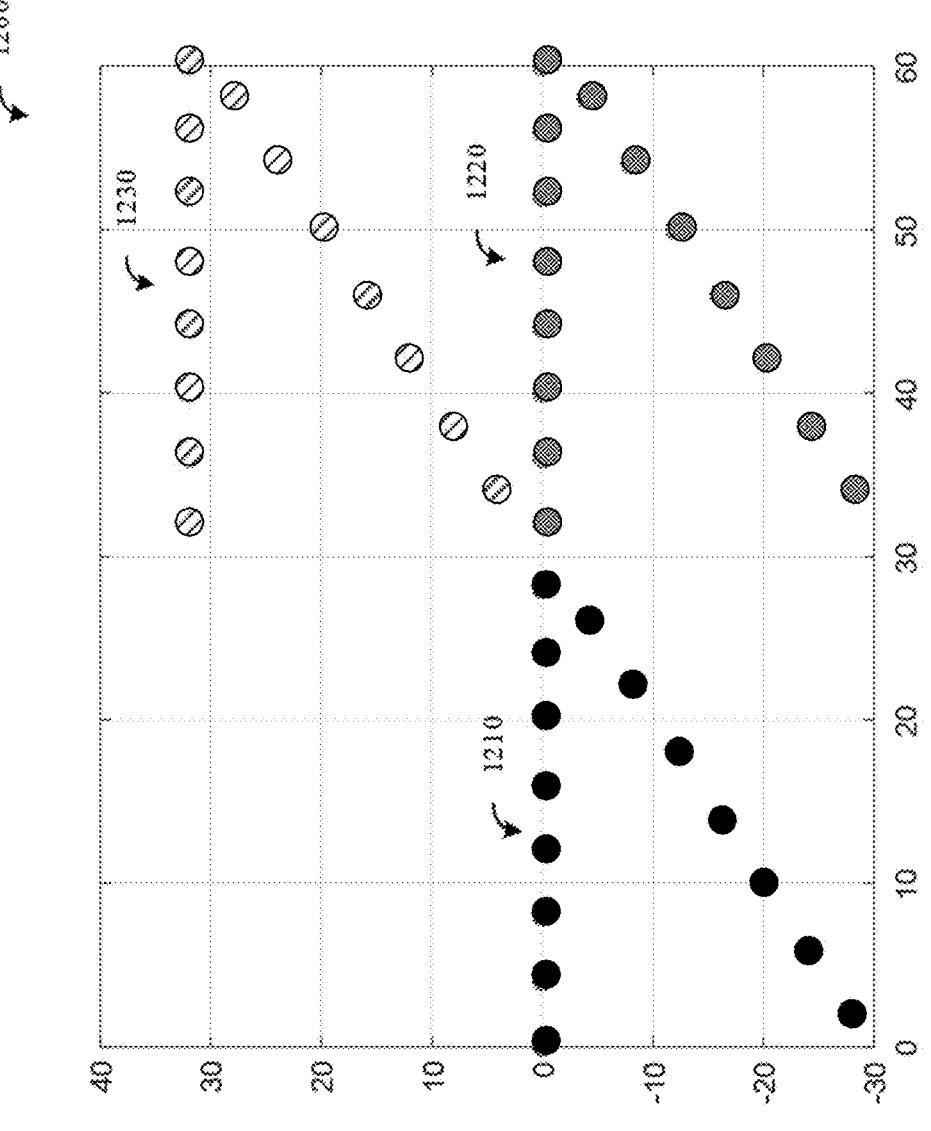
FIG. 12 illustrates a plot diagram of virtual array positions associated with the beamformer integrated circuit package tiles of FIG. 11 in accordance with one or more implementations of the subject technology.

FIG. 12 illustrates a plot diagram 1200 of virtual array positions associated with the beamformer integrated circuit package tiles of FIG. 11 in accordance with one or more implementations of the subject technology. The plot diagram 1200 includes virtual receive arrays 1210, 1220, and 1230. In some implementations, by selecting geometries for both physical transmit array and physical receive array, different, variable and suitable virtual receive array configurations may be created to meet the beam steering specifications. Depending on the physical array configurations in both transmit and receive arrays, virtual receive array configurations may be created and used for large diversity while alleviating the beam steering loss. The system architecture of the hybrid MIMO phased array system 1100 is highly flexible in that various active virtual array configurations may be obtained by either changing the transmit antennas (e.g., 1120-1, 1120-2, 1120-3) spacing and relative locations, and/or the shape and size of the physical receive array (e.g., 1110-1, 1110-2, 1110-3, 1110-4, 1110-5, 1110-6, 1110-7, 1110-8, 1110-9, 1110-10, 1110-11, 1110-12, 1110-13, 1110-14, 1110-15).

Each of the virtual receive arrays is respectively associated with one of the beamformer integrated circuit package tiles 1120-1, 1120-2, 1120-3 (depicted as "TX1," "TX2," "TX3," respectively) of FIG. 11. For example, the virtual receive array 1210 is associated with the beamformer integrated circuit package tiles 1120-1, the virtual receive array 1220 is associated with the beamformer integrated circuit package tiles 1120-2, and the virtual receive array 1230 is associated with the beamformer integrated circuit package tiles 1120-3. Each of the receiver antennas (e.g., 1110-1, 1110-2, 1110-3, 1110-4, 1110-5, 1110-6, 1110-7, 1110-8, 1110-9, 1110-10, 1110-11, 1110-12, 1110-13, 1110-14, 1110-15) has a separate MIMO channel, such that any signal interference at the receiver antennas is reduced (or minimal). In this respect, the positions of the virtual receive arrays 1210, 1220, and 1230 may be delineated for each of the transmitter antennas in correspondence to the locations of the physical receiver antennas.

Figure 13:
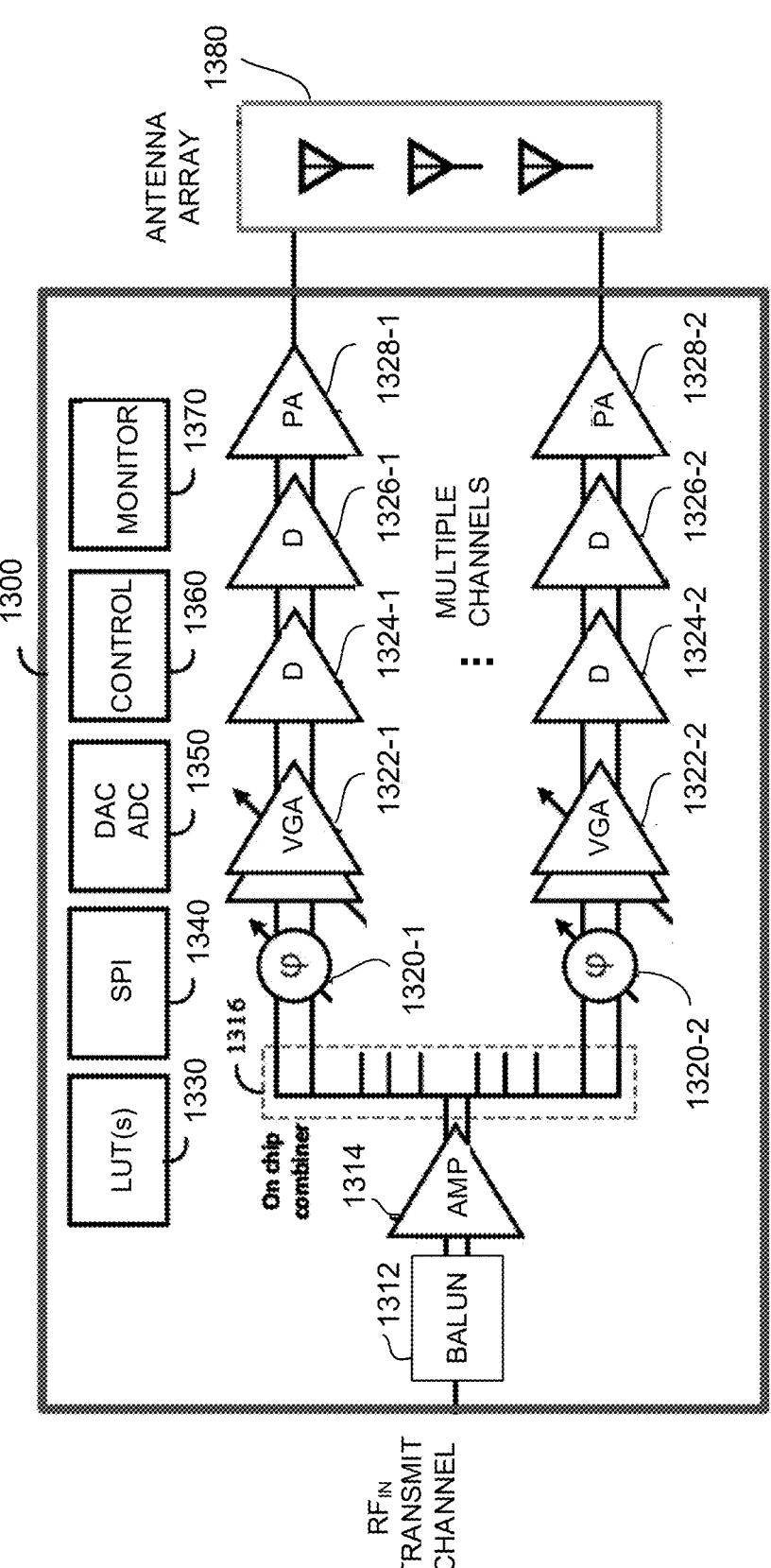
FIG. 13 illustrates a schematic diagram of a multi-channel transmitter Radio Frequency (RF) front-end beamformer in accordance with one or more implementations of the subject technology.

FIG. 13 illustrates a schematic diagram of a multi-channel transmitter Radio Frequency (RF) front-end beamformer 1300 in accordance with one or more implementations of the subject technology. The multi-channel transmitter RF front-end beamformer 1300 includes a balun 1312, an amplifier 1314, an on-chip splitter network 1316, phase shifters 1320-1 and 1320-2, variable gain amplifiers 1322-1 and 1322-2 (depicted as "VGA"), drivers 1324-1, 1324-2, 1326-1, 1326-2, power amplifiers 1328-1 and 1328-2 (depicted as "PA"), look-up tables 1330, Serial Peripheral Interface (SPI) module 1340, converter modules 1350 (depicted as "DACs/ ADCs"), Proportional-To-Absolute-Temperature (PTAT) module 1360, and monitor 1370, such as a temperature and failure monitoring module. One or more implementations may include a subset of the depicted components or additional components not shown in the figure. Variations in the arrangement and type of the components may be made without departing from the scope of the claims as set forth herein. Additional components, different components, or fewer components may be provided. The system illustrated receives an RF input for the transmit channel which is processed by unit 1300 and output to transmit antenna array 1380. The beamform parameters and other control information may be stored in memory, such as LUT 1330. For a scan operation, the period and order of the beams formed may also be stored therein. A transceiver (not shown) provides the modulated signal for transmission, such as Frequency Modulated Continuous Wave (FMCW), from which the received signal provides information as to location, velocity, and/or acceleration and so forth. The phase shifters 1320 may be implemented in discreet components or integrated into a millimeter wave integrated circuit (MMIC).

The balun 1312 is directly coupled to a transmitter channel input terminal for receiving outgoing RF signaling in an operational frequency range 76-81 GHz. In some respects, the multi-channel transmitter RF front-end beamformer 1300 is coupled to a transceiver (not shown) through the transmitter channel input terminal. The transmitter channel input terminal may be single ended. The balun 1312 may drive single-ended signaling to feed a differential front-end amplifier, such as the amplifier 1314. In this respect, the amplifier 1314 is coupled to a differential output port of the balun 1312. The amplifier 1314 drives differential signaling to the on-chip splitter network 1316. The on-chip splitter network 1316 may include a predetermined number of transmitter channels, such as up to 16 channels. Each transmitter channel includes a differential signal path between the on-chip splitter network 1316 to an antenna module 1380. In some implementations, the on-chip splitter network 1316 includes a 1-to-16 Wilkinson power splitter.

In a first transmitter channel, the on-chip splitter network 1316 feeds the phase shifter 1320-1 that is then coupled to the variable gain amplifier 1322-1. The variable gain amplifier 1322-1 is coupled to the driver 1324-1 that is then coupled to the driver 1326-1. The driver 1326-1 is coupled to the power amplifier 1328-1 that is then coupled to the antenna module 1380 over a single-ended (or non-differential) connection.

Similarly, in a second transmitter channel, the on-chip splitter network 1316 feeds the phase shifter 1320-2 that is then coupled to the variable gain amplifier 1322-2. The variable gain amplifier 1322-2 is coupled to the driver 1324-2 that is then coupled to the driver 1326-1. The driver 1326-1 is coupled to the power amplifier 1328-1 that is then coupled to the antenna module 1380 over a single-ended (or non-differential) connection.

The phase shifters 1320-1 and 1320-2 may be active phase shifters in some implementations or may be passive phase shifters in other implementations. In some respects, the variable gain amplifiers 1322-1 and 1322-2 may each be multi-stage amplifiers, such as a 2-stage variable gain amplifier. Each of the variable gain amplifiers 1322-1 and 1322-2 may operate to vary its gain based at least on a control voltage. In some implementations, each pairing of drivers (e.g., drivers 1324-1 and 1326-1, and drivers 1324-2 and 1326-2) may operate as a multi-stage driver. In some implementations, the power amplifiers 1328-1 and 1328-2 are multi-stage amplifiers, such as a 3-stage power amplifier. The antenna module 1380 is, or includes at least a portion of, the transmitter array comprised of beamformer integrated circuit package tiles.

In some respects, the look-up tables 1330 operate to store, and to provide access to, data associated with phase shifting and/or antenna control of the antenna module 1380. In some examples, the look-up tables 1330 store data associated with one or more RF beams. In some respects, the SPI module 1340 may operate to provide a bidirectional serial connection to an on-board processor. In some respects, the converter modules 1350 operate to provide analog-to-digital conversion and/or digital-to-analog conversion of RF signaling. In some implementations, the converter modules 1350 are coupled to one or more of the phase shifters 1320-1 and 1320-2 or the variable gain amplifiers 1322-1 and 1322-2. In some respects, the PTAT module 1360 may operate to provide bias control of current driving circuitry associated with one or more of the RF transmitter channels. In other respects, the PTAT module 1360 may operate to provide bias voltage control. In some respects, the temperature and failure monitoring module 1370 may operate to measure temperature on the multi-channel transmitter RF front-end beamformer 1300 and determine any failures associated with electrostatic discharge.

Figure 14:
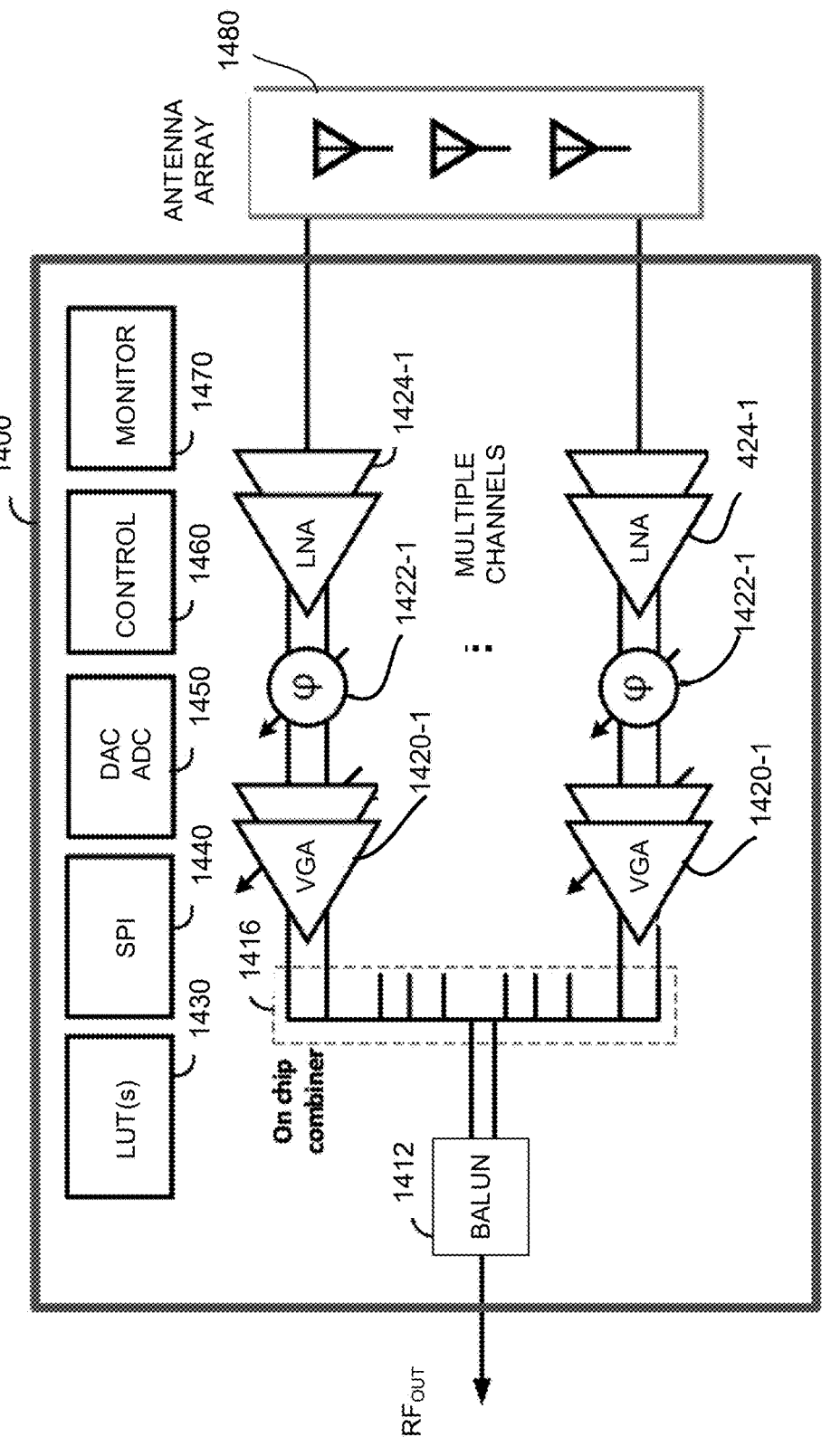
FIG. 14 illustrates a schematic diagram of a multi-channel receiver RF front-end beamformer in accordance with one or more implementations of the subject technology.

FIG. 14 illustrates a schematic diagram of a multi-channel receiver RF front-end beamformer 1400 in accordance with one or more implementations of the subject technology. The multi-channel receiver RF front-end beamformer 1400 includes a balun 1412, an on-chip combiner network 1416, variable gain amplifiers 1420-1 and 1420-2 (depicted as "VGA"), phase shifters 1422-1 and 1422-2, low-noise amplifiers 1424-1 and 1424-2 (depicted as "LNA"), look-up tables 1430, SPI module 1440, converter modules 1450 (depicted as "DACs/ADCs"), PTAT module 1460, and temperature and failure monitoring module 1470. Given that some of the elements are similar to those discussed in FIG. 13, and for purposes of brevity, only the elements unique to FIG. 14 will be discussed. One or more implementations may include a subset of the depicted components or additional components not shown in the figure. Variations in the arrangement and type of the components may be made without departing from the scope of the claims as set forth herein. Additional components, different components, or fewer components may be provided.

The balun 1412 is directly coupled to a receiver channel output terminal for outputting received RF signaling in an operational frequency range 76-81 GHz. The balun 1412 may drive differential signaling from a differential front-end amplifier, such as the on-chip combiner network 1416 to feed the receiver channel output terminal. The on-chip combiner network 1416 may include a predetermined number of receiver channels, such as up to 16 channels. Each receiver channel includes a differential signal path between the on-chip combiner network 1416 to an antenna module 1480. In some implementations, the on-chip combiner network 1416 includes a 16-to-1 Wilkinson power combiner.

In a first receiver channel, the on-chip combiner network 1416 feeds the variable gain amplifier 1420-1 that is then coupled to the phase shifter 1422-1. The low-noise amplifier 1424-1 is coupled to the input of the phase shifter 1422-1. The low-noise amplifier 1424-1 is coupled to the antenna module 1480 over a single-ended (or non-differential) connection. In operation, the low-noise amplifier 1424-1 receives return RF signaling from the antenna module 1480, and drives the filtered signaling to the phase shifter 1422-1 for applying a phase shift to the RF signaling. The phase shifted signaling is then fed to the variable gain amplifiers 1420-1 for amplification.

Similarly, in a second receiver channel, the on-chip combiner network 1416 feeds the variable gain amplifier 1420-2 that is then coupled to the phase shifter 1422-2. The low-noise amplifier 1424-2 is coupled to the input of the phase shifter 1422-2. The low-noise amplifier 1424-2 is coupled to the output of the antenna module 1480 over a single-ended (or non-differential) connection. The antenna array 1480 is a receive antenna which may be separate from or combined with a transceiver antenna, such as antenna array 1380 of FIG. 13.

In some respects, the low-noise amplifiers 1424-1 and 1424-2 are multi-stage amplifiers, such as 2-stage low-noise amplifiers. Alike in the transmitter channel, the variable gain amplifiers 1420-1 and 1420-2 may each be multi-stage amplifiers, such as a 2-stage variable gain amplifier. In a radar operation, the transmit and receive antenna cooperate to understand the environment and the return time and angle of arrival of a return signal with respect to transmission time and transmit angle.

Figure 15:
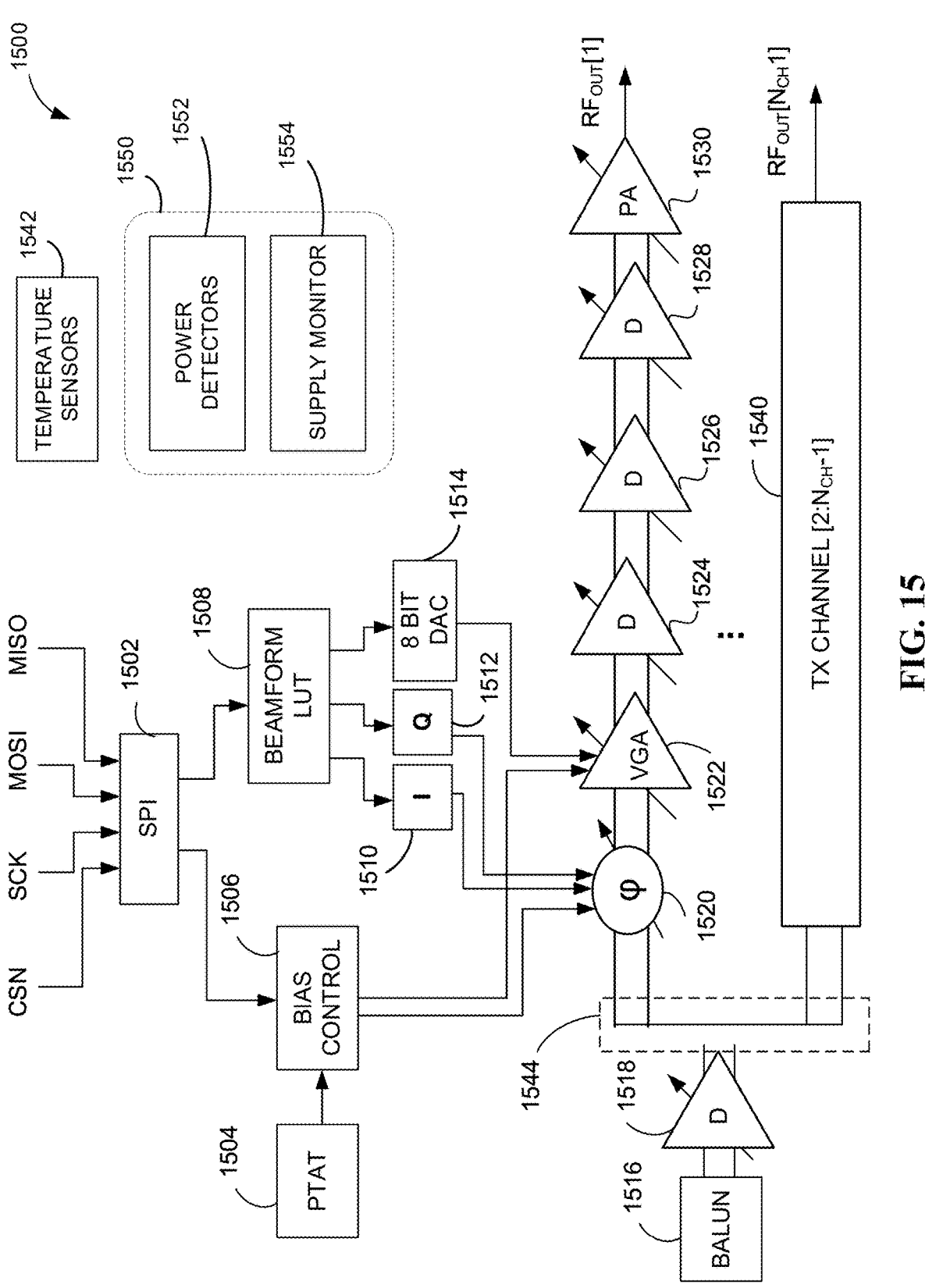
FIG. 15 illustrates a schematic diagram of a mixed-signal portion of the multi-channel transmitter RF front-end beamformer of FIG. 13 in accordance with one or more implementations of the subject technology.

FIG. 15 illustrates a schematic diagram of a mixed-signal portion 1500 of the multi-channel transmitter RF front-end beamformer 1300 of FIG. 13 in accordance with one or more implementations of the subject technology. The mixed-signal portion 1500 includes SPI module 1502, PTAT module 1504, bias control module 1506, TX beam look-up table (LUT) 1508, DAC modules 1510-1514, balun 1516, driver 1518, splitter network 1544, phase shifter 1520, variable gain amplifier 1522, drivers 1524-1528, power amplifier 1530, transmission channel 1540 (depicted as "TX Channel [2:$N_{ch}$-1]"), temperature sensor 1542, and failure monitoring module 1550. The failure monitoring module 1550 includes power detector module 1552 and supply monitoring module 1554. Given that some of the elements are similar to those discussed in FIG. 13, and for purposes of brevity, only the elements unique to FIG. 15 will be discussed. One or more implementations may include a subset of the depicted components or additional components not shown in the figure. Variations in the arrangement and type of the components may be made without departing from the scope of the claims as set forth herein. Additional components, different components, or fewer components may be provided.

The SPI module 1502 is coupled to the bias control module 1506 and to the TX beam LUT 1508. The SPI module 1502 operates to receive an input clock signal (e.g., SCK), a chip select signal (e.g., CSn), a Master-Out-Slave-In (MOSI) signal, and Master-In-Slave-Out (MISO) signal. The PTAT module 1504 is coupled to the bias control module 1506. The bias control module 1506 is coupled to the driver 1518, the phase shifter 1520, the variable gain amplifier 1522, the drivers 1524-1528, and the power amplifier 1530 to drive bias current signals over individual control (or overhead) lines. The TX beam LUT 1508 is coupled to the DAC modules 1510-1514. In some respects, the TX beam LUT 1508 is, or includes at least a portion of, the look-up tables 1330. In some examples, the TX beam LUT 1508 may store up to 128 predefined beam directions. The DAC module 1510 is coupled to the phase shifter 1520 and drives an 8-bit In-phase (I) component signal to the phase shifter 1520. The DAC module 1512 is coupled to the phase shifter 1520 and drives an 8-bit Quadrature (Q) component signal to the phase shifter 1520. The DAC module 1514 is coupled to the variable gain amplifier 1522 and drives an 8-bit DAC signal to the variable gain amplifier 1522 as control signaling. In some respects, the transmitter channels (e.g., the transmitter channel 1540) operate to drive an RF output bus (depicted as "RFOUT[N$_{ch}$-1]"), where the power amplifier 1530 operates to output the RFOUT[1] bus signal. In some respects, the temperature sensor 1542 includes a diode-based temperature sensor.

Figure 16:
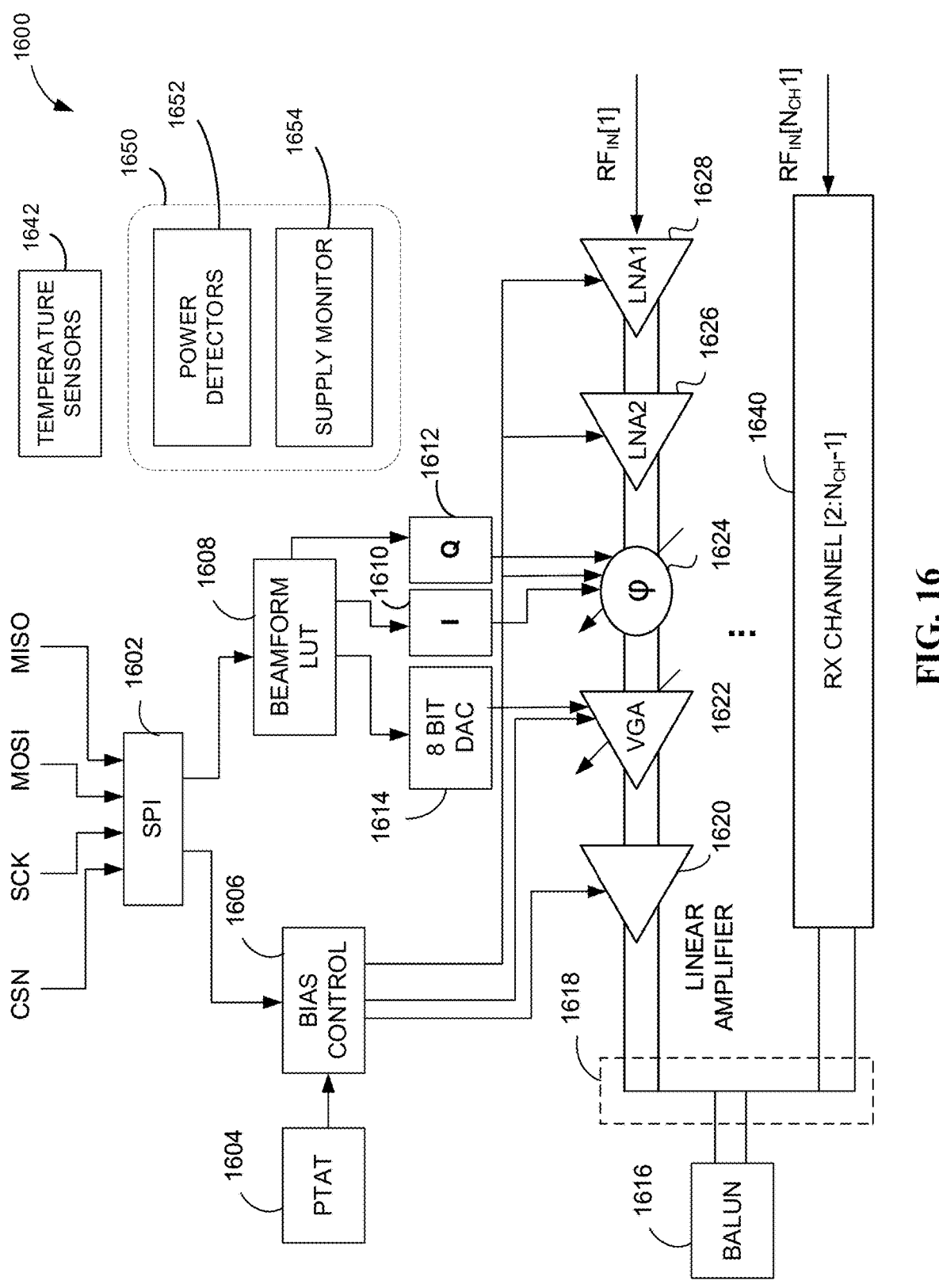
FIG. 16 illustrates a schematic diagram of a mixed-signal portion of the multi-channel receiver RF front-end beamformer of FIG. 14 in accordance with one or more implementations of the subject technology.

FIG. 16 illustrates a schematic diagram of a mixed-signal portion 1600 of the multi-channel receiver RF front-end beamformer 1600 in accordance with one or more implementations of the subject technology. The mixed-signal portion 1600 includes SPI module 1602, PTAT module 1604, bias control module 1606, RX beam LUT 1608, DAC modules 1610-1614, balun 1616, combiner network 1618, linear amplifier 1620, variable gain amplifier 1622, phase shifter 1624, low-noise amplifiers 1626 and 1630, receiver channel 1640 (depicted as "RX Channel [2:N$_{ch}$-1]"), temperature sensor 1642, and failure monitoring module 1650. The failure monitoring module 1650 includes power detector module 1652 and supply monitoring module 1654. Given that some of the elements are similar to those discussed in FIG. 14, and for purposes of brevity, only the elements unique to FIG. 16 will be discussed. One or more implementations may include a subset of the depicted components or additional components not shown in the figure. Variations in the arrangement and type of the components may be made without departing from the scope of the claims as set forth herein. Additional components, different components, or fewer components may be provided.

The SPI module 1602 is coupled to the bias control module 1606 and to the RX beam LUT 1608. The SPI module 1602 operates to receive an input clock signal (e.g., SCK), a chip select signal (e.g., CSn), a Master-Out-Slave-In (MOSI) signal, and Master-In-Slave-Out (MISO) signal. The PTAT module 1604 is coupled to the bias control module 1606. The bias control module 1606 is coupled to the linear amplifier 1620, the variable gain amplifier 1622, the phase shifter 1624, and the low-noise amplifiers 1626 and 1630 to drive bias current signals over individual control (or overhead) lines. The RX beam LUT 1608 is coupled to the DAC modules 1610-1614. In some respects, the RX beam LUT 1608 is, or includes at least a portion of, the look-up tables 1330. The DAC module 1610 is coupled to the phase shifter 1624 and drives an 8-bit In-phase (I) component signal to the phase shifter 1624. The DAC module 1612 is coupled to the phase shifter 1624 and drives an 8-bit Quadrature (Q) component signal to the phase shifter 1624. The DAC module 1614 is coupled to the variable gain amplifier 1622 and drives an 8-bit DAC signal to the variable gain amplifier 1622 as control signaling. In some respects, the receiver channels (e.g., the receiver channel 1640) operate to receive an RF input bus (depicted as "RFIN[N$_{ch}$-1]"), where the low-noise amplifier 1630 operates to receive the RFIN[1] bus signal. In some respects, the temperature sensor 1642 includes a diode based temperature sensor.

Figure 17:
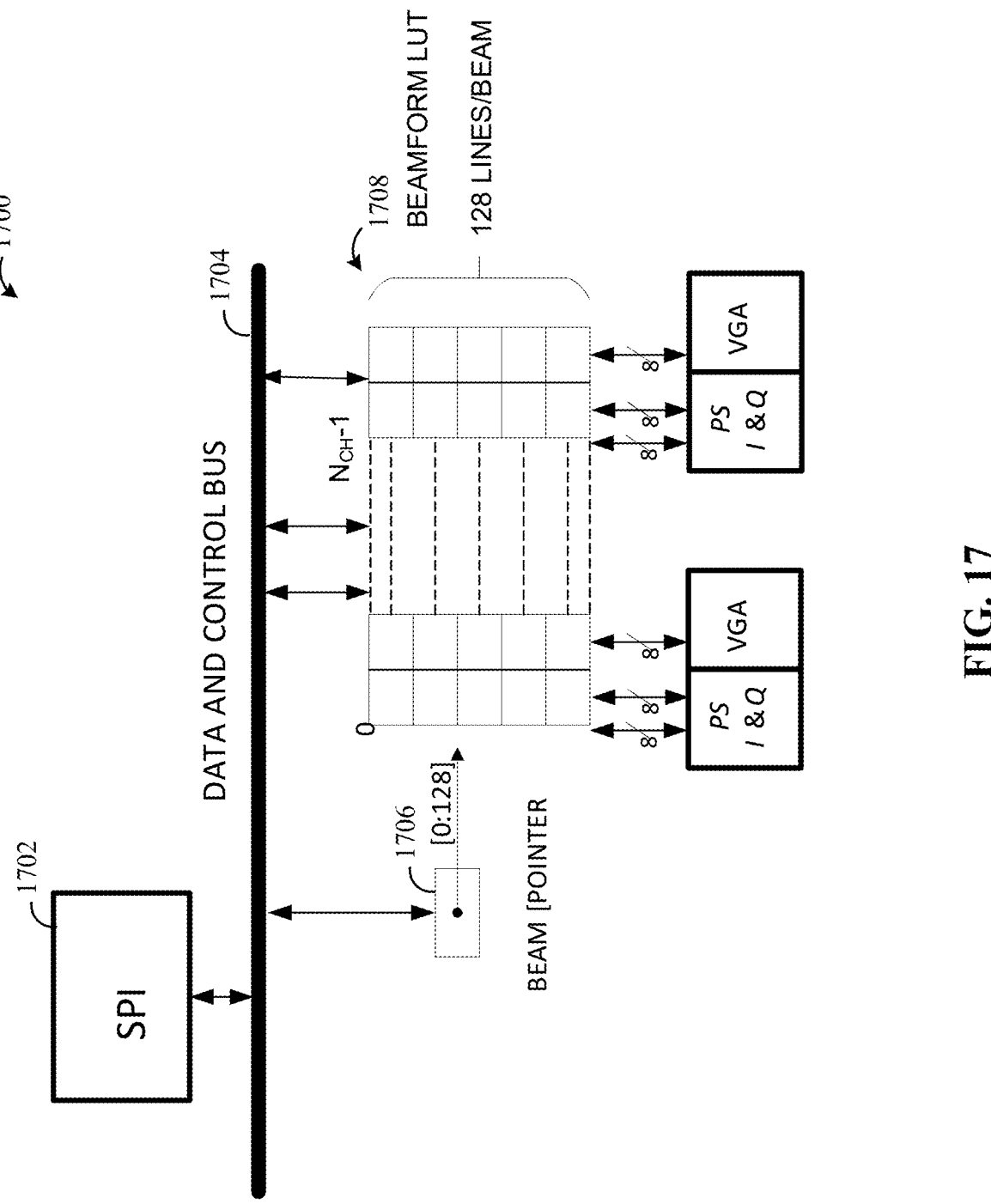
FIG. 17 illustrates a schematic diagram of a beam look-up table controller in a multi-channel a transmitter or receiver RF front-end beamformer in accordance with one or more implementations of the subject technology.

FIG. 17 illustrates a schematic diagram of a beam look-up table controller 1700 in a multi-channel a transmitter or receiver RF front-end beamformer in accordance with one or more implementations of the subject technology. The beam look-up table controller 1700 includes SPI module 1702, data and control bus 1704, beam pointer 1706, and beam look-up table 1708. One or more implementations may include a subset of the depicted components or additional components not shown in the figure. Variations in the arrangement and type of the components may be made without departing from the scope of the claims as set forth herein. Additional components, different components, or fewer components may be provided.

In order to allow for fast beam direction control, the beam look-up table 1708 is utilized. In some respects, the beam look-up table 1708 is an array comprised of the number of channels (along the x-axis) and the number of beams per channel (along the y-axis). For example, there may be 128 channels (depicted as N$_{ch}$) and potentially 128 lines per beam. The beam look-up table 1708 has 128 lines and is controlled with a beam pointer register (e.g., 1706) of 1 byte size. For each of the 128 beam directions, there may be 1 byte information that is sent through the SPI module 1702. In some respects, the beam look-up table 1708 is initialized upon power-up. In some respects, the beam look-up table 1708 is re-programmed on-the-fly (or in real-time). The data storage access by a read operation or a write operation may be performed over the data and control bus 1704 with control signaling from the SPI module 1702.

The beam look-up table controller 1700 includes the beam pointer 1706 that operates to index a stored location in a beam look-up table 1708. In some respects, the beam point 1706 selects which line of the beam look-up table 1708 is written to variable gain amplifier and phase shifter registers. The beam pointer 1706 may be controlled by signaling from the SPI module 1702 over the data and control bus 1704. The beam pointer may be a vector that contains locations within the beam look-up table 1708 for 128 beam directions. In some respects, output of all 16-channel registers associated with the variable gain amplifiers and phase shifters may be enabled simultaneously.

Figure 18:
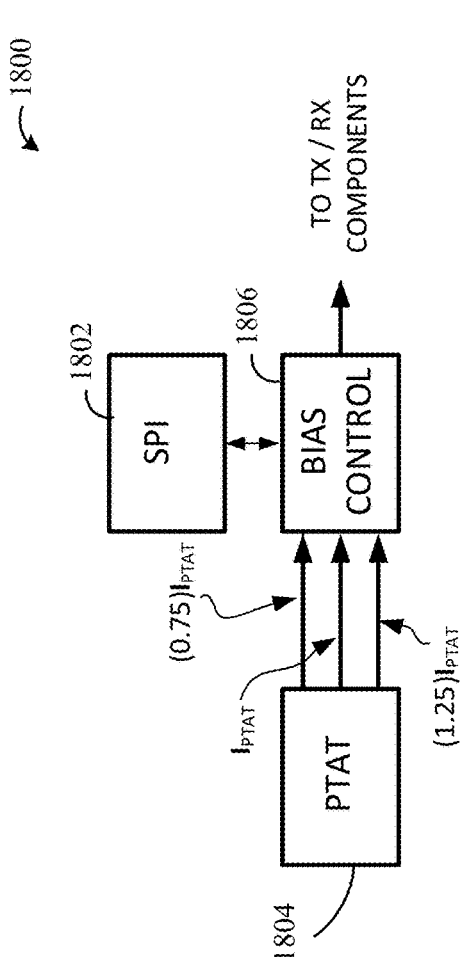
FIG. 18 illustrates a schematic diagram of a bias controller in the beam look-up table controller of FIG. 17and a frame format for the bias controller in accordance with one or more implementations of the subject technology.

FIG. 18 illustrates a schematic diagram of a bias controller 1800 in the beam look-up table controller of FIG. 17 in accordance with one or more implementations of the subject technology. The bias controller 1800 includes SPI module 1802, PTAT module 1804, and bias control module 1806. The SPI module 1802 has a bidirectional connection with the bias control module 1806. The PTAT module 1804 has unidirectional connections to the bias control module 1806. In each unidirectional connection, the PTAT module 1804 supplies a bias current value for setting bias currents for TX/RX components. In a first bias current signal, the PTAT module 1804 supplies a first current at 75% of the nominal bias value (e.g., $0.75I_{PTAT}$). In a second bias current signal, the PTAT module 1804 supplies a second current at the nominal bias value (e.g., $I_{PTAT}$). In a third bias current signal, the PTAT module 1806 supplies a third current at 125% of the nominal bias value (e.g., $1.25I_{PTAT}$).

FIG. 18 also illustrates a schematic diagram of a frame format 1850 for the bias controller of FIG. 18 in accordance with one or more implementations of the subject technology. The frame format 1850 represents a frame structure for both transmitter and receiver channels. In some respects, the frame format 1850 corresponds to a bias set register having a size of about 3 bytes (or 24 bits) with about 14 information bits. In some respects, each bias value corresponds to about 2 bits (depicted as "Bias 0," "Bias1," "Bias2," "Bias3," "Bias4," "Bias5").

Figure 19:
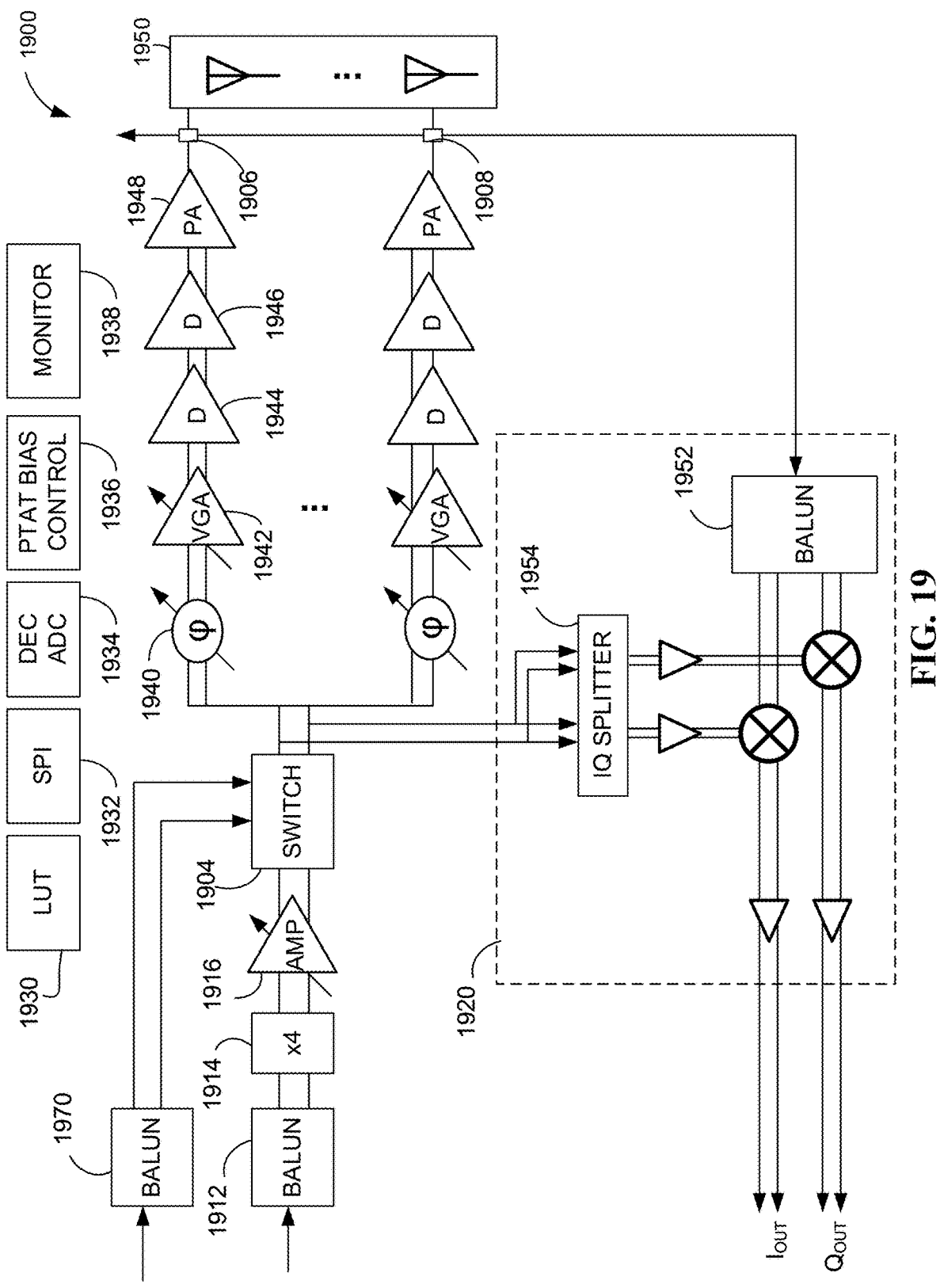
FIG. 19 illustrates a schematic diagram of another example of a multi-channel transmitter RF front-end beamformer in accordance with one or more implementations of the subject technology.

FIG. 19 illustrates a schematic diagram of another example of a multi-channel transmitter RF front-end beamformer 1900 in accordance with one or more implementations of the subject technology. Given that some of the elements are similar to those discussed in FIG. 13, and for purposes of brevity, only the elements unique to FIG. 19 will be discussed. The multi-channel transmitter RF front-end beamformer 1900 includes a switch 1904, bidirectional couplers 1906 and 1908, Intermediate Frequency (IF) module 1910, and test circuit 1920. One or more implementations may include a subset of the depicted components or additional components not shown in the figure. Variations in the arrangement and type of the components may be made without departing from the scope of the claims as set forth herein. Additional components, different components, or fewer components may be provided.

The IF module 1910 is coupled to an IF input terminal 1902 for receiving signals at an operational frequency range of 19.0 GHz to 20.5 GHz. The IF module 1910 includes a balun 1912, a multiplier 1914, and amplifier 1916. The IF input terminal 1902 is coupled to the balun 1912. The balun 1912 is coupled to the multiplier 1914 that is then coupled to the amplifier 1916. The amplifier 1916 is coupled to the switch 1904. The switch 1904 may toggle between RF signaling at an operational frequency range of 76.0 GHz to 81.0 GHz and the IF signaling through the IF input terminal 1902. In some implementations, the test circuit 1920 is a built-in self-test circuit and calibration loop. In some respects, the test circuit 1920 is coupled to the bidirectional couplers 1906 and 1908 for operating the calibration loop.

Figure 20:
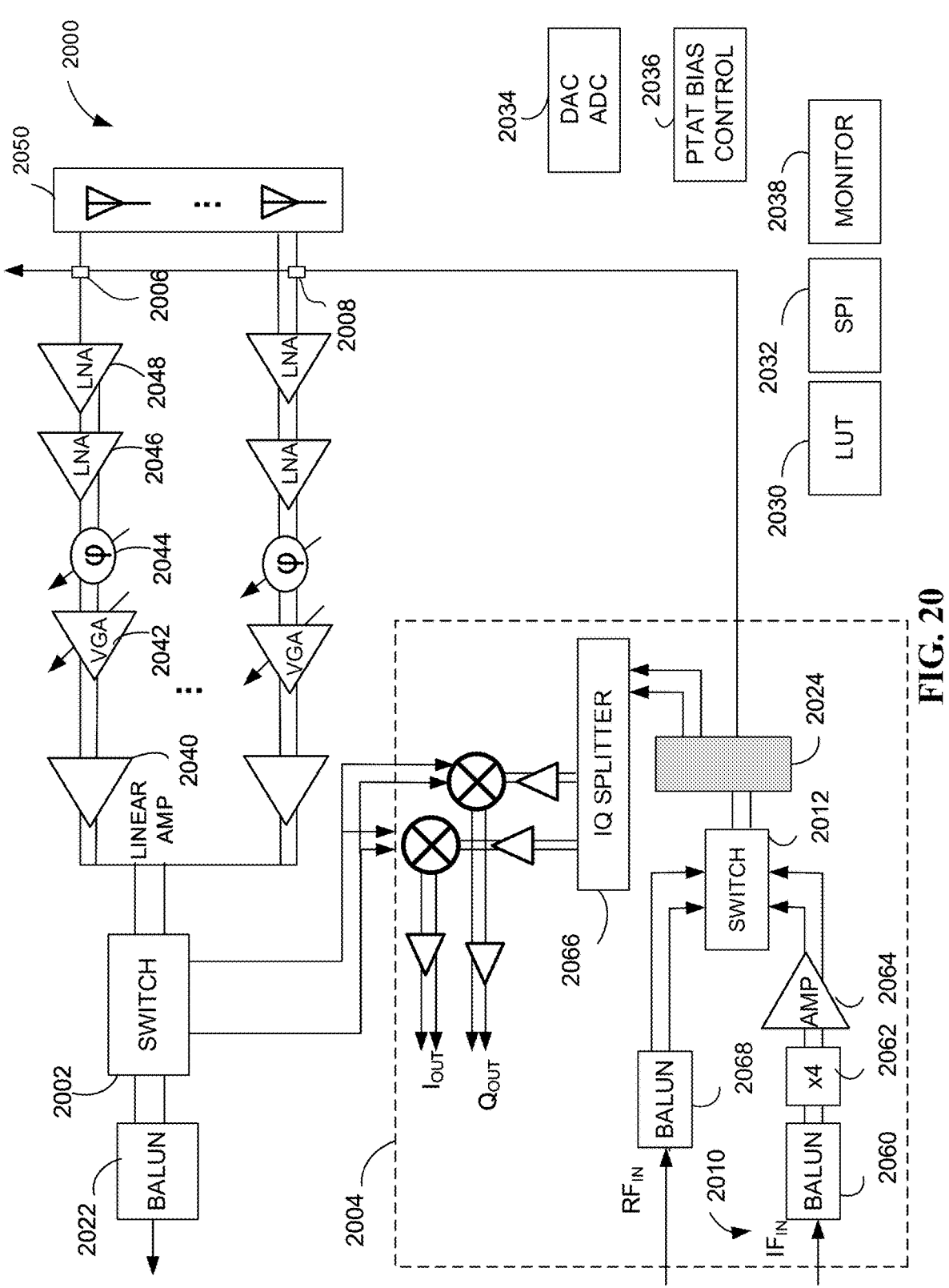
FIG. 20 illustrates a schematic diagram of another example of a multi-channel receiver RF front-end beamformer in accordance with one or more implementations of the subject technology.

FIG. 20 illustrates a schematic diagram of another example of a multi-channel receiver RF front-end beamformer 2000 in accordance with one or more implementations of the subject technology. Given that some of the elements are similar to those discussed in FIGS. 14 and 19, and for purposes of brevity, only the elements unique to FIG. 20 will be discussed. The multi-channel receiver RF front-end beamformer 2000 includes a switch 2002, bidirectional couplers 2006 and 2008, and test circuit 2004. One or more implementations may include a subset of the depicted components or additional components not shown in the figure. Variations in the arrangement and type of the components may be made without departing from the scope of the claims as set forth herein. Additional components, different components, or fewer components may be provided.

In some implementations, the test circuit 2004 is a built-in self-test circuit and calibration loop. In some respects, the test circuit 2004 is coupled to the bidirectional couplers 2006 and 2008 for operating the calibration loop. In this embodiment, the test circuit 2004 includes an IF test input terminal 2010 for receiving test signals at an operational frequency range of 19.0 GHz to 20.5 GHz as well as test signals at an operational frequency range of 76.0 GHz to 81.0 GHz. A switch 2012 in the test circuit 2004 may toggle between the RF signaling and the IF signaling.

The test circuit 2004 includes a splitter 2066 to separate in-phase (I) and quadrature (Q) signals. Inputs to the test circuit 2004 come through balun 2068 receiving a test RF signal ($RF_{IN}$) coupled to switch 2012 and balun 2060 receiving an intermediate frequency signal ($IF_{IN}$) and coupled to switch 2012 through a multiplier 2062 and amplifier 2064. The switch 2012 is coupled to module 2024, which provides signals to IQ splitter 2066 and couplers

2008, 2006. The system 2000 also includes digital and analog converter 2034, bias control 2036, monitor 2038, SPI 2032 and LUT 2030.

The present inventions are directed to beamformer tiles having an array of radiating elements and a plurality of radio frequency (RF) integrated circuits coupled to the array of radiating elements and configured to apply phase shifting to transmit signaling directed to the array of radiating elements for a transmit operation and to return signaling from the array of radiating elements for a receive operation, wherein each of the plurality of radio frequency integrated circuits comprises a plurality of Multiple-In-Multiple-Out (MIMO) channels that are coupled to a subset of the array of radiating elements.

The beamformer tile may have one or more radio frequency integrated circuits is configured to drive MIMO channels to a subset of the array of radiating elements and configured to operate as a transmitter antenna or a receiver antenna.

In some embodiments, a beamforming antenna system includes beamformer tiles, each with an array of radiating elements, multiple RFICs adapted to apply phase shifting to a transmit array for transmit signaling and to apply phase shifting to the return array for return signaling. The RFICs may include multiple MIMO channels coupled to a subset of radiating elements. The beamformer tiles may be arranged to form a MIMO configuration using one or more virtual receive arrays and the beamformer tiles may be arranged with a predetermined spacing as a function of wavelength. The beamformer tiles may be arranged in a diagonal arrangement.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not imply selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations may also be implemented in combination in a single implementation. Conversely, various features that are described in the context of a single implementation may also be implemented in multiple implementations separately or in any suitable sub combination. Moreover, although features may be described above as acting in certain combinations and even initially claimed as such, one or more features from a claimed combination may in some cases be excised from the combination, and the claimed combination may be directed to a sub combination or variation of a sub combination.

The subject matter of this specification has been described in terms of particular respects, but other respects, may be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims may be performed in a different order and still achieve desirable results. As one example, the processes depicted in the accompanying figures may be performed in other order in addition to the particular order shown, or sequential order, to achieve desirable results. Moreover, the separation of various system components in the respects, described above should not be understood as requiring such separation in all respects, and it should be understood that the described program components and systems may generally be integrated together in a single hardware product or packaged into multiple hardware products. Other variations are within the scope of the following claim.

What is claimed is:

1. A beamformer tile, comprising:
an array of radiating elements; and
a plurality of radio frequency (RF) integrated circuits (RFICs) coupled to the array of radiating elements and configured to apply phase shifting to transmit signaling directed to the array of radiating elements for a transmit operation and to return signaling from the array of radiating elements for a receive operation, wherein the beamformer tile comprises one RFIC for every sixteen radiating elements of the array of radiating elements, and wherein the plurality of RFICs are mounted on a first surface of a substrate and the array of radiating elements are mounted on a second surface of the substrate, the first surface is opposite the second surface,
wherein each of the plurality of radio frequency integrated circuits comprises a plurality of Multiple-In-Multiple-Out (MIMO) channels that are coupled to a subset of the array of radiating elements,
wherein the array is a transmit array and is adapted for operation with a second beamformer tile configured to operate as a receive antenna, wherein the beamformer tile is configured to operate as a transmit antenna, and
wherein the beamformer tile operating as the transmit antenna and the second beamformer tile operating as the receive antenna are configured to operate as a virtual array having a virtual aperture greater than an aperture of the beamformer tile.

2. The beamformer tile of claim 1, wherein one or more of the plurality of radio frequency integrated circuits is configured to drive a plurality of MIMO channels to a subset of the array of radiating elements.

3. The beamformer tile of claim 1, wherein the beamformer tile is further configured to operate with a third beamformer tile configured to operate as a second transmit antenna.

4. The beamformer tile of claim 1, wherein the array of radiating elements are configured in subarrays and each subarray corresponding to a millimeter wave IC (MMIC), and wherein each MMIC controls phases of signals radiating from the subarray.

5. The beamformer tile of claim 1, wherein the radiating elements are separated by half a transmit wavelength.

6. The beamformer tile of claim 1, wherein the radiating elements are separated by twice a transmit wavelength.

7. A radar system, comprising:
a plurality of beamformer tiles, wherein each of the plurality of beamformer tiles comprises:
an array of radiating elements; and
a plurality of radio frequency (RF) integrated circuits (RFICs) coupled to the array of radiating elements and configured to apply phase shifting and transmit signaling directed to the array of radiating elements for a transmit operation and return signaling from the array of radiating elements for a receive operation, wherein a beamformer tile of the plurality of beamformer tiles comprises one RFIC for every sixteen radiating elements of the array of radiating elements, and wherein the plurality of RFICs are mounted on a first surface of a substrate and the array of radiating elements are mounted on a second surface of the substrate, the first surface is opposite the second surface,
wherein each of the plurality of radio frequency integrated circuits comprises a plurality of Multiple-In-Multiple-Out (MIMO) channels that are coupled to a subset of the array of radiating elements,
wherein the plurality of beamformer tiles are arranged to form a MIMO configuration using one or more virtual receive arrays,
wherein the plurality of beamformer tiles comprises a transmit beamformer tile and a receive beamformer tile, and
wherein the transmit beamformer tile operating as a transmit antenna and the receive beamformer tile operating as a receive antenna are configured to operate as a virtual array having a virtual aperture greater than an aperture of either the transmit beamformer tile or the receive beamformer tile.

8. The radar system of claim 7, wherein two or more of the plurality of beamformer tiles are arranged with a predetermined spacing as a function of a transmit signal wavelength.

9. The radar system of claim 7, wherein two or more of the plurality of beamformer tiles are arranged in a diagonal arrangement.

10. The radar system of claim 7, wherein the radar system transmits frequency modulated continuous wave (FMCW) signals.

11. The radar system of claim 7, wherein a first set of the radiating elements operates as a transmit antenna and a second set of the radiating elements operates as a receive antenna, the system further comprising:

a transceiver adapted to generate signals for transmit and receive antennas;

a power combiner coupled between the transceiver and the receive antenna; and a power splitter coupled between the transceiver and the transmit antenna.

12. A beamformer tile, comprising:

a substrate layer;

an array of antenna elements patterned on a first surface of the substrate layer; and one radio frequency integrated circuit (RFIC) for every sixteen antenna elements of the array of antenna elements, wherein the one RFIC is coupled to a second surface of the substrate layer, and the first surface is opposite the second surface, wherein the RFIC is adapted to form a beam for the antenna elements, wherein the array is a transmit array and is adapted for operation with a second beamformer tile configured to operate as a receive antenna, wherein the beamformer tile configured to operate as a transmit antenna, and wherein the beamformer tile operating as the transmit antenna and the second beamformer tile operating as the receive antenna are configured to operate as a virtual array having a virtual aperture greater than an aperture of the beamformer tile.

13. The beamformer tile of claim 12, wherein a geometry of the beamformer tile and an arrangement of the antenna elements determine a virtual array operation.

14. The beamformer tile of claim 12, wherein the beamformer tile is adapted for a hybrid Multiple-In-Multiple-Out (MIMO) phased array system having transmit and receive beamformer tiles.

15. The beamformer tile of claim 14, wherein the hybrid MIMO phased array system has a first number of beamformer tiles arranged along a first axis and a second number of beamformer tiles arranged along a second axis.

16. The beamformer tile of claim 15, wherein the second axis is diagonal to the first axis, and wherein the first number of beamformer tiles of the hybrid MIMO phased array system are spaced to accommodate the second number of beamformer tiles between adjacent beamformer tiles of the first number of beamformer tiles on the first axis.

* * * * *